United States Patent
Zhou et al.

(10) Patent No.: US 12,200,513 B2
(45) Date of Patent: Jan. 14, 2025

(54) BEAM GROUP SPECIFIC MEDIUM ACCESS CONTROL-CONTROL ELEMENT (MAC-CE) BASED BEAM FAILURE RECOVERY (BFR) REQUESTS

(71) Applicant: QUALCOMM Incorporated, San Diego, CA (US)

(72) Inventors: Yan Zhou, San Diego, CA (US); Tianyang Bai, Somerville, NJ (US); Mostafa Khoshnevisan, San Diego, CA (US); Tao Luo, San Diego, CA (US); Xiaoxia Zhang, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 601 days.

(21) Appl. No.: 17/448,624

(22) Filed: Sep. 23, 2021

(65) Prior Publication Data
US 2022/0104036 A1    Mar. 31, 2022

Related U.S. Application Data

(60) Provisional application No. 63/085,128, filed on Sep. 29, 2020.

(51) Int. Cl.
| | |
|---|---|
| *H04W 24/04* | (2009.01) |
| *H04B 7/0408* | (2017.01) |
| *H04W 72/21* | (2023.01) |
| *H04W 72/23* | (2023.01) |
| *H04B 7/06* | (2006.01) |

(52) U.S. Cl.
CPC .......... *H04W 24/04* (2013.01); *H04B 7/0408* (2013.01); *H04W 72/21* (2023.01); *H04W 72/23* (2023.01); *H04B 7/0695* (2013.01)

(58) Field of Classification Search
CPC ..... H04W 24/04; H04W 72/21; H04W 72/23; H04B 7/0408; H04B 7/0695; H04B 7/088
See application file for complete search history.

(56) References Cited

U.S. PATENT DOCUMENTS

| | | | |
|---|---|---|---|
| 2020/0052769 A1* | 2/2020 | Cirik | H04L 1/0026 |
| 2020/0259703 A1* | 8/2020 | Cirik | H04L 5/0048 |

(Continued)

OTHER PUBLICATIONS

"[draft] Reply LS on MAC CE design for SCell BFR"; Apple; 3GPP TSG-RAN WG1 Meeting #98 R1-1909829 Prague, Czech Republic, Aug. 26-30, 2019 (Year: 2019).*

(Continued)

*Primary Examiner* — Benjamin H Elliott, IV
(74) *Attorney, Agent, or Firm* — Dalei Dong; Haynes and Boone, LLP

(57) ABSTRACT

In accordance with some embodiments, wireless communication for transmission of a beam failure recovery (BFR) MAC-CE is disclosed. A method performed on a user equipment (UE) includes detecting a beam failure of at least one beam of a beam group. The method further comprises triggering a BFR in response to the detection of the beam failure of the at least one beam of the beam group. In addition, the method includes generating a BFR medium access control-control element (MAC-CE) that includes BFR information associated with the beam group. Further, the method comprises transmitting the BFR MAC-CE that includes the BFR information associated with the beam group using a transmission resource.

28 Claims, 14 Drawing Sheets

(56) References Cited

U.S. PATENT DOCUMENTS

| | | | | |
|---|---|---|---|---|
| 2020/0267048 | A1* | 8/2020 | Yu | H04B 7/0695 |
| 2020/0267797 | A1* | 8/2020 | Wei | H04W 76/19 |
| 2020/0350973 | A1* | 11/2020 | Cirik | H04W 74/0833 |
| 2021/0028848 | A1* | 1/2021 | Tsai | H04W 72/23 |
| 2021/0105176 | A1* | 4/2021 | Tsai | H04W 72/23 |
| 2021/0376909 | A1* | 12/2021 | Khoshnevisan | H04W 72/046 |
| 2021/0409096 | A1* | 12/2021 | Liou | H04L 1/1614 |
| 2022/0103234 | A1* | 3/2022 | Zhou | H04W 72/21 |
| 2022/0103419 | A1* | 3/2022 | Zhou | H04W 72/23 |
| 2022/0104036 | A1* | 3/2022 | Zhou | H04W 24/04 |
| 2022/0131593 | A1* | 4/2022 | Yang | H04W 76/19 |
| 2022/0173788 | A1* | 6/2022 | Kang | H04L 1/1864 |
| 2022/0263539 | A1* | 8/2022 | Chen | H04W 72/23 |
| 2022/0286183 | A1* | 9/2022 | Yi | H04L 5/0053 |
| 2023/0131368 | A1* | 4/2023 | Jang | H04B 7/0695 |
| | | | | 370/216 |
| 2023/0140323 | A1* | 5/2023 | Wang | H04L 27/261 |
| | | | | 370/329 |
| 2023/0254712 | A1* | 8/2023 | Li | H04L 5/0048 |
| | | | | 370/216 |
| 2023/0353224 | A1* | 11/2023 | Jia | H04W 24/10 |

OTHER PUBLICATIONS

"Enhanced Reliability and Capacity with Multi-TRP Transmission"; Khoshnevisan et al.; IEEE Communications Standards Magazine • Mar. 2022 (Year: 2022).*

Foreign priority application CN201911083599.9, Nov. 7, 2019, for PCT/CN2020/126111; retrieved from the internet (WIPO) on Mar. 19, 2024 (Year: 2019).*

International Search Report and Written Opinion—PCT/US2021/052048—ISA/EPO—Mar. 22, 2022.

Ericsson: "Spatial Relations and MAC CE", 3GPP Draft, R2-2001237, 3GPP TSG-RAN WG2 #109-e, 3rd Generation Partnership Project (3GPP), Mobile Competence Centre, 650, Route Des Lucioles, F-06921 Sophia-Antipolis Cedex, France, vol. RAN WG2, No. Electronic meeting, 20200224-20200306, Feb. 14, 2020 (Feb. 14, 2020), XP051849555, 5 pages, Retrieved from the Internet: URL:https://ftp.3gpp.org/tsg_ran/WG2_RL2/TSGR2_109_e/Docs/R2-2001237.zip R2-2001237 Spatial Relations and MAC CE.docx [retrieved on Feb. 14, 2020] paragraph [2.2MACCE].

Partial International Search Report—PCT/US2021/052048—ISA/EPO—Jan. 28, 2022.

Qualcomm Incorporated: "Procedures and MAC CE Design for BFR for SCells", 3GPP Draft, R2-1916067, 3GPP TSG-RAN WG2 Meeting #108, 3rd Generation Partnership Project (3GPP), Mobile Competence Centre, 650, Route Des Lucioles, F-06921 Sophia-Antipolis Cedex, France, vol. RAN WG2, No. Reno, Nevada, US, 20191118-20191122, Nov. 8, 2019 (Nov. 8, 2019), XP051817617, pp. 1-5, Retrieved from the Internet: URL:https://ftp.3gpp.org/tsg_ran/WG2_RL2/TSGR2_108/Docs/R2-1916067.zip, R2-1916067_Procedures and MAC CE design for BFR for SCells.docx [retrieved on Nov. 8, 2019] paragraph [2.2MACCEdesign], figure 1.

* cited by examiner

BEAM GROUP SPECIFIC MEDIUM ACCESS CONTROL-CONTROL ELEMENT (MAC-CE) BASED BEAM FAILURE RECOVERY (BFR) REQUESTS

The present application claims priority to and the benefit of the U.S. Provisional Patent Application No. 63/085,128, filed Sep. 29, 2020, titled "Beam Group Specific MAC-CE Based BFR Requests," which is hereby incorporated by reference in its entirety as if fully set forth below and for all applicable purposes.

TECHNICAL FIELD

This application relates to wireless communication systems, and more particularly to beam group specific Medium Access Control-Control Element (MAC-CE) based Beam Failure Recovery Requests (BFRQ).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In some wireless communications systems, a UE and a base station may communicate over a communication link using a directional beam. Changes in the radio environment between the UE and the base station may degrade the quality of the beam used by the UE and the base station, which may result in communication failures between the UE and a serving cell (e.g., primary cell (Pcell), secondary cell (Scell), or both). The UE may attempt to perform a beam failure recovery (BFR) procedure to re-establish connection with the serving cell. Additionally, in some wireless communications systems a UE may be in communication with more than one transmission-reception point (TRP) (e.g., in a multi-TRP configuration) of a serving cell. Each of the more than one TRP may transmit downlink transmissions to the UE according to a beam configuration and the UE may decode the downlink transmissions from each of the more than one TRPs according to the beam configurations. Efficient detection and recovery from beam failures in multi-TRP configurations may help enhance multi-TRP communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In accordance with some embodiments, wireless communication for transmission of a beam failure recovery (BFR) MAC-CE is disclosed. A method performed on a user equipment (UE) includes detecting a beam failure of at least one beam of a beam group; triggering a beam failure recovery (BFR) in response to the detection of the beam failure of the at least one beam of the beam group; generating a BFR medium access control-control element (MAC-CE) that includes BFR information associated with the beam group; and transmitting the BFR MAC-CE that includes the BFR information associated with the beam group using a transmission resource.

In accordance with some embodiments, a UE can include a memory; a processor coupled to the memory and configured to: detect a beam failure of at least one beam of a beam group; trigger a beam failure recovery (BFR) in response to the detection of the beam failure of the at least one beam of the beam group; and generate a BFR medium access control-control element (MAC-CE) that includes BFR information associated with the beam group; and a transceiver coupled to the processor and configured to: transmit the BFR MAC-CE that includes the BFR information associated with the beam group using a transmission resource.

In accordance with some embodiments, a method of wireless communication performed by a base station (BS) is disclosed. The method comprises: configuring a user equipment (UE) for transmission of a beam failure recovery (BFR) MAC-CE; and receiving the BFR MAC-CE from the UE, the BFR MAC-CE identifying one or more failed beams and one or more candidate replacement beams.

In accordance with some embodiments, a base station (BS) can include a memory; a processor coupled to the memory and configured to: configure a user equipment (UE) for transmission of a beam failure recovery (BFR) MAC-CE; and a transceiver coupled to the processor and configured to: receive the BFR MAC-CE from the UE, the BFR MAC-CE identifying one or more failed beams and one or more candidate replacement beams.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
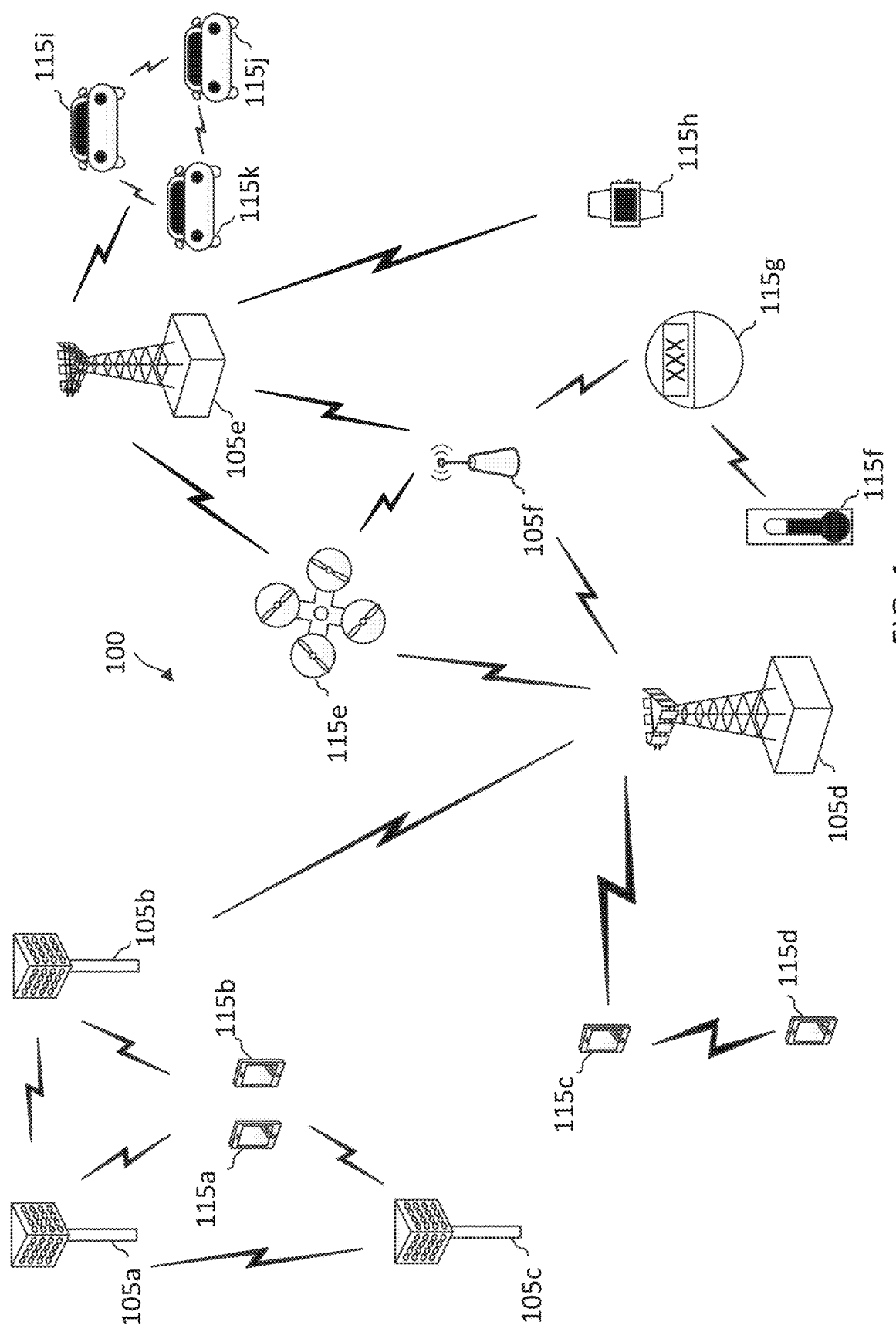
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive internet of things (IoTs) with a ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In some wireless communications systems, a user equipment (UE) may support communications with a serving cell via multiple beam groups. In some instances, each beam group may be associated with one or more transmission-reception points (TRPs), one or more beam directions, and/or one or more other spatial beam parameters. The UE may receive downlink transmissions (e.g., via a physical downlink shared channel (PDSCH)) from multiple TRPs. Additionally, the UE may decode each of the downlink transmissions according to a beam configuration associated with the downlink transmission. Further, such multi beam group communications may be primary cell (Pcell) communications, secondary cell (Scell) communications, or both. In some cases, one or more beams from a particular beam group may degrade to a point where effective communication via the beam is unlikely. Thus, beam failure detection (BFD), beam failure recovery (BFR), radio link monitoring (RLM), and/or radio link failure (RLF) recovery in such cases may be beneficial to help communications. In cases where multiple beam groups are used for communications, techniques such as discussed herein may be used to identify a communication failure (e.g., beam failure and/or RLF) in a serving cell and/or recover from the communication failure based on a beam failure parameter of a beam group (e.g., TRP), a beam failure parameter of the cell, or both a beam failure parameter of a beam group and a beam failure parameter of the cell.

In some cases, a UE may establish a connection with a Pcell and a Scell, where the Scell, and in some cases the Pcell, use beamformed communications via two or more beam groups (e.g., transmission-reception points (TRPs)). In some cases, the different beam groups may be associated with different control resource set (CORESET) pool index values, and one or more component carriers (CCs) may be configured with multiple CORESET pool index values. Thus, from the perspective of the UE, different TRPs are transparent, and the UE can identify different CORESET pool index values associated with received signals.

In some cases, the UE may perform BFD procedures that may identify one or more beams associated with a particular CORESET pool index value that have a degraded channel quality. In some cases, reference signals transmitted via each of the TRPs (e.g., for BFD or for candidate beam detection (CBD)) may provide an indication of a corresponding CORESET pool index (e.g., based on a reference signal sequence), which may be detected at the UE. In some cases, the UE may determine to declare a beam failure for one or more beams, and may initiate a beam failure recovery (BFR) in response. In some cases, a BFR MAC-CE containing information regarding the beam group and beam failure, as discussed further below, is provided.

In operation, the UE in the serving cell may operate with per-beam group beam failure detection and/or recovery parameters, cell-level beam failure detection and/or recovery parameters, or a combination of per-beam group and cell-level beam failure detection and/or recovery parameters. Accordingly, in some instances a UE may perform BFD based on per-beam group BFD parameters or based on cell-level BFD parameters. Similarly, in some instances the UE may perform BFR based on per-beam group BFR parameters or based on cell-level BFR parameters. Therefore, in some instances the UE may perform BFD based on per-beam group BFD parameters and perform BFR based on cell-level BFR parameters, or vice versa (perform BFD based on cell-level BFD parameters and perform BFR based on per-beam group BFR parameters). The per-beam group and/or the cell-level BFD and/or BFR parameters may be dynamically configured (e.g., by a serving cell, BS, UE, or otherwise), predefined (e.g., by network operator, serving cell, BS, UE, standard provisions, or otherwise), or a combination of dynamically configured and predefined.

In accordance with some embodiments, wireless communication for transmission of a beam failure recovery (BFR) MAC-CE is disclosed. A method performed on a user equipment (UE) includes detecting a beam failure of at least one beam of a beam group; triggering a beam failure recover (BFR) in response to the detection of the beam failure of the at least one beam of the beam group; generating a BFR medium access control-control element (MAC-CE) that includes BFR information associated with the beam group; and transmitting the BFR MAC-CE that includes the BFR information associated with the beam group using a transmission resource.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, hybrid TDM-FDM techniques, or spatial division multiplexing (SDM). A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the component carrier (CC) to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. In some aspects, the network 100 may utilize an FBE-based contention scheme for sharing a radio channel among multiple BSs 105 and/or UEs 115 of different network operating entities and/or different radio access technologies (RATs).

Figure 2A:
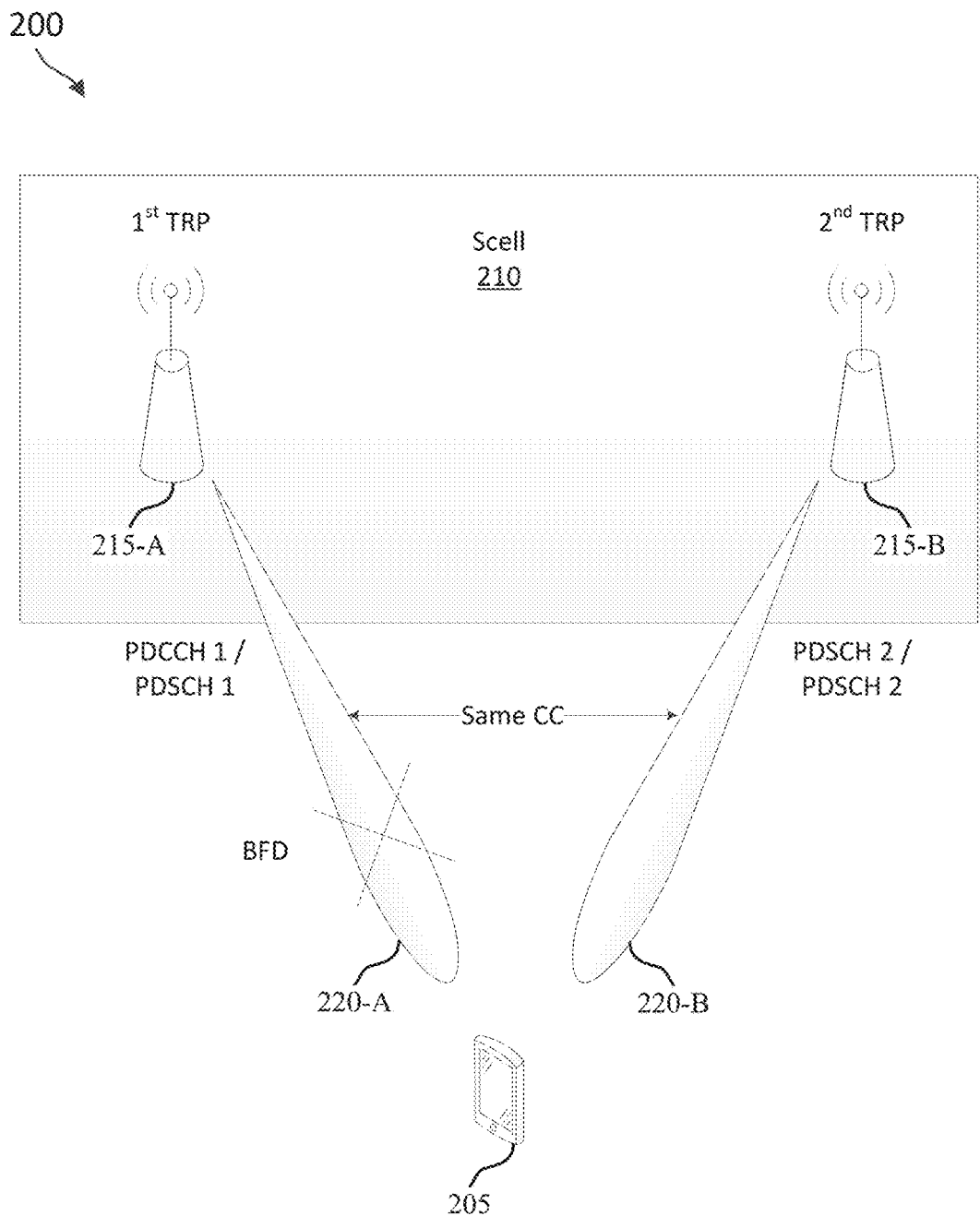
FIG. 2A illustrates an example of a portion of a wireless communication system that supports beam failure recovery techniques for multiple transmission-reception points (TRPs) in a primary or secondary cell according to some aspects of the present disclosure.

FIG. 2A illustrates an example of a wireless communications system 200 that supports beam failure recovery techniques for multiple transmission-reception points (TRPs) in serving cell 210 (Pcell and/or Scell) in accordance with aspects of the present disclosure. As discussed above, the multiple TRPs illustrated in FIG. 2A are examples of multiple beam groups. In some examples, wireless communications system 200 may implement aspects of wireless communications system 100. Wireless communications system 200 may include a UE 205 and in communications with a number of TRPs 215, which may be examples of the corresponding devices described herein. TRPs 215 may, in this example, provide a multi-TRP serving cell, for example, in which a first beam 220-a of a first TRP 215-a and a second beam 220-b of a second TRP 215-b provide communications with the UE 205.

In some cases, the multi-TRP transmissions may be configured based on a single downlink control information (DCI) communication. In some cases, the multi-TRP transmissions may be configured based on multiple downlink control information m(DCI) communications, in which a first DCI (e.g., transmitted in PDCCH1 from first TRP 215-a) schedules a downlink shared channel transmission (e.g., PDSCH1 transmitted from first TRP 215-a via first beam 220-a), and a second DCI (e.g., transmitted in PDCCH2 from second TRP 215-b) schedules a second downlink shared channel transmission (e.g., PDSCH2 transmitted from second TRP 215-b via second beam 220-b). TRP 215 differentiation at the UE 205, in some cases, may be based on a value of a CORESET pool index (e.g., CORESETPoolIndex), where each CORESET (e.g., up to a maximum of five CORESETs) can be configured with a value of CORESET pool index. In some cases, the value of CORESET pool index can be zero or one, which groups the CORESETs into two groups that may correspond to the different TRPs 215. Only some CCs may be configured with two values of CORESET pool index, while other CCs may not be configured with two values of CORESET pool index and thus BFD/BFR for on a per-TRP 215 basis may be provided for CCs that are configured with two values of CORESET pool index.

In some cases, the UE 205 may be configured to provide per-TRP 215 BFR, which enables separate BFD and separate CBD for the beams corresponding to a TRP 215 in a CC that is configured with two values of CORESET pool index. In the absence of per-TRP 215 BFR, beam failure detection and beam candidate determination may not be triggered until all beams in that CC become weak. With per-TRP 215 BFR, when beams for a given TRP become weak, recovery procedures can be done and a best beam corresponding to that TRP 215 can be identified without having to wait for the beams of the other TRP 215 to also become weak, and thus reliability and communications efficiency can be enhanced. In the example, of FIG. 2A, serving cell 210 may be configured with two values of CORESET pool index, with one value associated with the first TRP 215-a and a second value associated with second TRP 215-b. In this case, each TRP 215 may transmit one or more BFD reference signals that may be monitored by the UE 205. In this example, the UE 205 may determine that the first beam 220-a of the first CORESET pool index value has a channel metric (e.g., a reference signal received power RSRP)) that is below a threshold value (e.g., when radio link quality is worse than a threshold $Q_{out}$ for reference signals in BFD reference signal that are associated with CORESET pool index value) for a period of time. Various examples of beam failure declaration, candidate beam detection, and beam recovery are discussed further below.

Figure 2B:
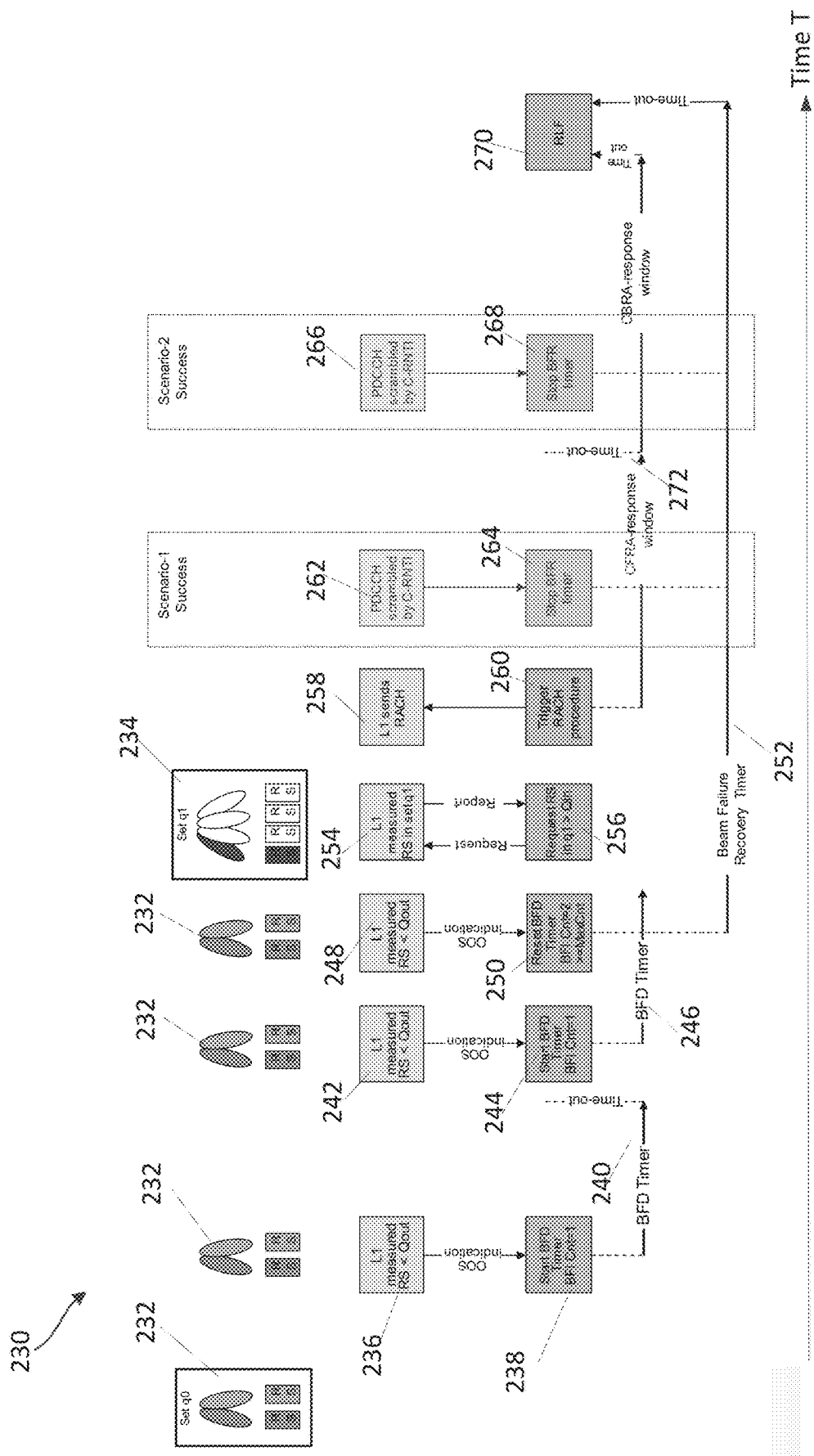
FIG. 2B illustrates aspects of beam failure recovery according to some aspects of the present disclosure.

FIG. 2B illustrates an example sequence 230 that illustrates beam failure detection (BFD) and beam failure recovery (BFR) in a system such as that illustrated in FIG. 2A. As illustrated in FIG. 2B, TRP set q0 232 is providing communications. As illustrated, set q0 includes two TRP reference signals (RS), indicating two communicating beams. For instance, the TRP set q0 232 are reference signals transmitted by the TRP 215-a and/or the TRP 215-b and monitored and measured by the UE 205 for BFD. In step 236, the level of one or more of the TRP resources in set 232 is measured and determined to be below a threshold value Qout, resulting in provision of an out-of-sync (OOS) indication. In step 238, in response to the OOS indication, a beam failure detector timer is started and a beam failure index (BFI) count is set to 1. However, as indicated in FIG. 2B, BFD timer 240 times out prior to receipt of another OOS indication.

In step 242 the level of one or more of the TRP resources in set 232 is measured and determined to be below a configurable threshold value Qout resulting in provision of an OOS indication. As before, in step 244 a BFD timer 246 is started and a BFI counter initiated. As is illustrated in FIG. 2B in step 248, one or more of the TRP resources in set 232 is again measured and determined to be below a threshold value Qout resulting in provision of another OOS indication that occurs within BFD timer 246. In step 250, the BFI counter is incremented until the BFI counter is at a MaxCnt value. In this particular example, MaxCnt is set to 2, however MaxCnt can be configurably set to any integer such that if the TRP resources result in OOS indication for set period of time.

In step 250, with BFI counter at the MaxCnt value, a BFR timer 252 is started. In step 254, a reference signal received power (RSRP) corresponding to the TRP RS q1 234 is measured to have a value greater than the threshold. In step 256, a report is received from step 254 and a request for the TRP resource in set 234 is presented. In step 260, a random access procedure on a Random Access Channel (RACH) can be triggered and in step 258 the RACH request can be sent, for example to a primary cell (PCell) receiver of the request. Transmission of the RACH message can trigger a response window 272. Within the first timing window, a PDCCH 262 can be received that stops the BFR timer 264 within the time-out period of the response window 272 or a PDCCH 266 that stops BFR 268 after the response window time out but before the BFR timer 252 timeout results in adaption of the TRP resource from set q1 234. However, if step 270 is reached, the BFR times out and results in overall failure to recover in step 270.

Figure 3A:
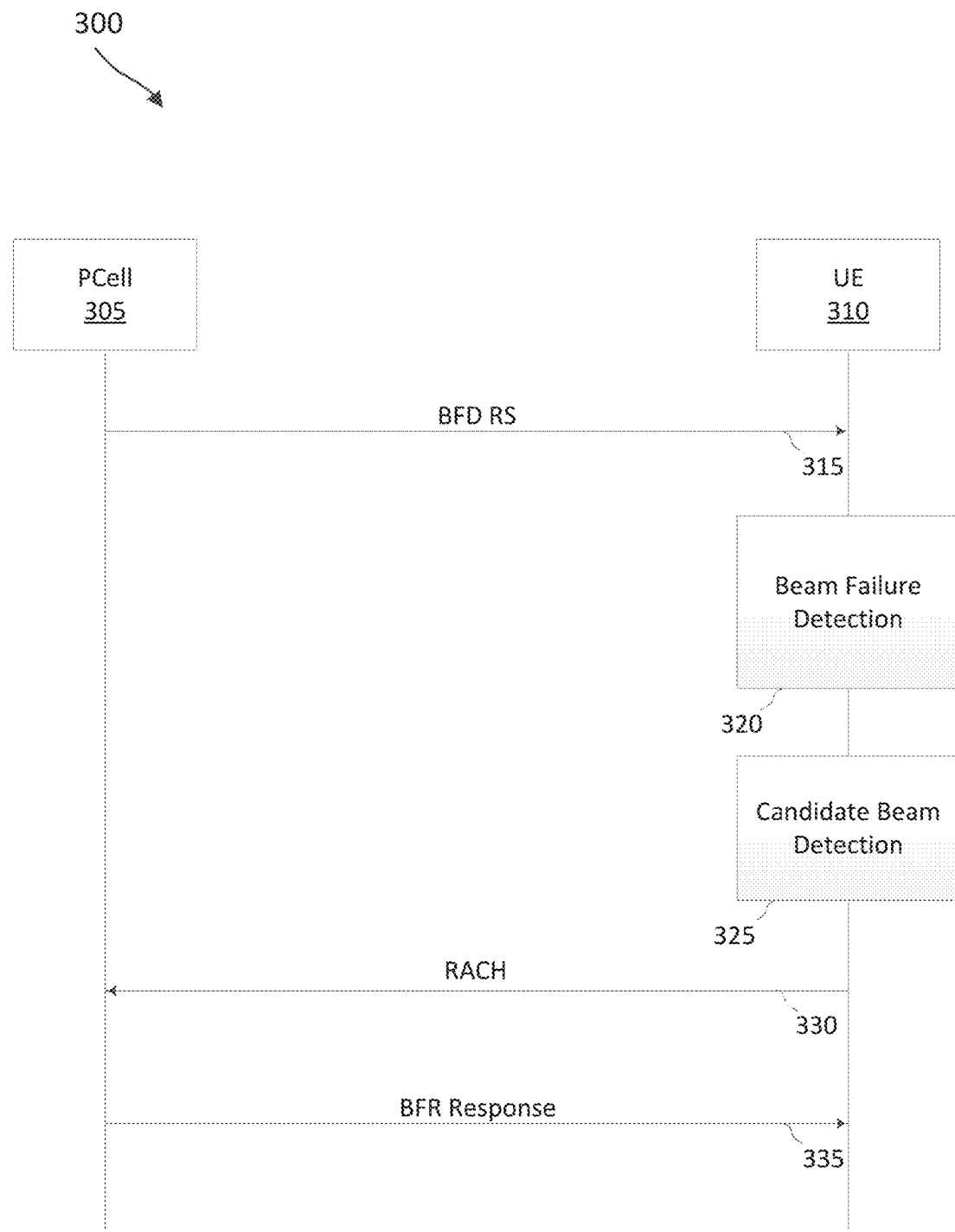
FIG. 3A illustrates an example of a process flow that supports beam failure recover techniques for multiple transmission-reception points according to some aspects of the present disclosure.

FIG. 3A illustrates an example of a process flow 300 that supports beam failure recovery techniques for multiple beam groups in a serving cell in accordance with aspects of the present disclosure. In some examples, process flow 300 may implement aspects of wireless communications system 100 or 200 and further illustrates aspects of the process flow 230 of FIG. 2B. Process flow 300 may be implemented by a UE 310 and a PCell 305 that has two values of CORESET pool index values (and is served by multiple different beam groups) as described herein. In the following description of the process flow 300, the communications between the UE 310 and the Pcell 305 may be transmitted in a different order than the example order shown, or the operations performed by the UE 310 and Pcell 305 may be performed in different orders or at different times. Some operations may also be omitted from the process flow 300, and other operations may be added to the process flow 300.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At message 315, the Pcell 305 may transmit, and UE 310 may receive, one or more BFD reference signals of a set of BFD reference signals. In this regard, the UE 310 may be monitoring for the BFD reference signals based on a beam group BFD parameter or a cell-level BFD parameter. The UE 310 may measure one or more channel metrics of the BFD reference signals as part of a BFD. In accordance with various aspects, the BFD reference signals may be transmitted by different beam groups, and have multiple CORESET pool index values, and the BFD reference signals have an indication of the associated CORESET pool index value (e.g., zero or one, based on a reference signal sequence that is configured to a CORESET pool index value).

At step 320, the UE 310 may determine that a beam failure is detected (e.g., as discussed above in FIG. 2B). In some cases, the detection of the BFD may be based on a channel metric of the reference signal being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. In some instances, if the BFD reference signals are not configured, the reference signal sets indicated by the active TCI states of CORESETs monitored by the UE 310 may be used. If, for an active TCI state of a CORESET, there are multiple reference signal indices, the one with QCL-TypeD is preferentially used. Otherwise, QCL-TypeA, QCL-TypeB, or QCL-TypeC can be used. The physical layer in the UE 310 may assess the radio link quality according to the BFD set against the threshold value (e.g., $Q_{out}$). In some instances, if radio link quality is worse than $Q_{out}$ for all the reference signals in the BFD resource set, then the UE 310 may declare a beam failure.

At step 325, the UE 310 may perform candidate beam detection (CBD). In some cases, CBD may be based on periodic CSI-RS/SSB that are configured by RRC (e.g., configured by RRC parameter candidateBeamRSList). In some cases, up to 16 resources with the corresponding random access preamble index (e.g., ra-preamble-index) may be configured. The UE 310 may provide reference signal indices and the RSRP among the list that have equal or larger RSRP value than a threshold value (e.g., $Q_{in}$), which may be a configurable threshold.

At communications 330, the UE 310 may initiate a BFR based on a beam group BFD parameter or a cell-level BFD parameter. For example, in some instances the UE 310 may transmit a RACH request to the Pcell 305. In some cases, the UE 310 may initiate random access procedures (e.g., contention-free random access) based on the random access resource (e.g., ra-preamble-index) associated with a selected reference signal index with RSRP above the threshold (e.g., RS index q_new).

At communications 335, the Pcell 305 may transmit, and the UE 310 may receive, a BFR response based on a beam group BFD parameter or a cell-level BFD parameter. In some cases, the UE 310 may monitor PDCCH in a search space set provided by a RRC parameter (e.g., recoverySearchSpaceId) for detection of a DCI format with CRC scrambled by C-RNTI or MCS-C-RNTI starting from slot n+4. If the UE 310 receives the PDCCH within this window, BFR is completed. Following the BFR response, the UE 310 may use quasi co-located (QCL) RS assumptions that the same QCL parameters are associated with reference signal index q_new until the UE 310 receives an activation for a TCI state. In some cases, after a set of symbols (e.g., 28 symbols) from a last symbol of a first PDCCH reception where the UE 310 detects a DCI format with CRC scrambled by C-RNTI or MCS-C-RNTI, the UE 310 assumes the same QCL parameters as the ones associated with RS index q_new for PDCCH monitoring in a CORESET with index 0.

In some cases, Pcell 310 may be configured with multiple beam groups (e.g., TRPs), and the CORESET pool index may be configured with multiple values. In some cases, separate RACH resources may be configured for different CORESET pool index values, which may allow the UE 310 to indicate beam failure associated with a particular CORESET pool index value, which may be associated with a particular beam group. As discussed herein, in some cases, one or more Scells may be configured with multiple values of CORESET pool index, and a UE may perform a BFD/BFR for the Scell, an example of which is discussed with reference to FIG. 3B.

Figure 3B:
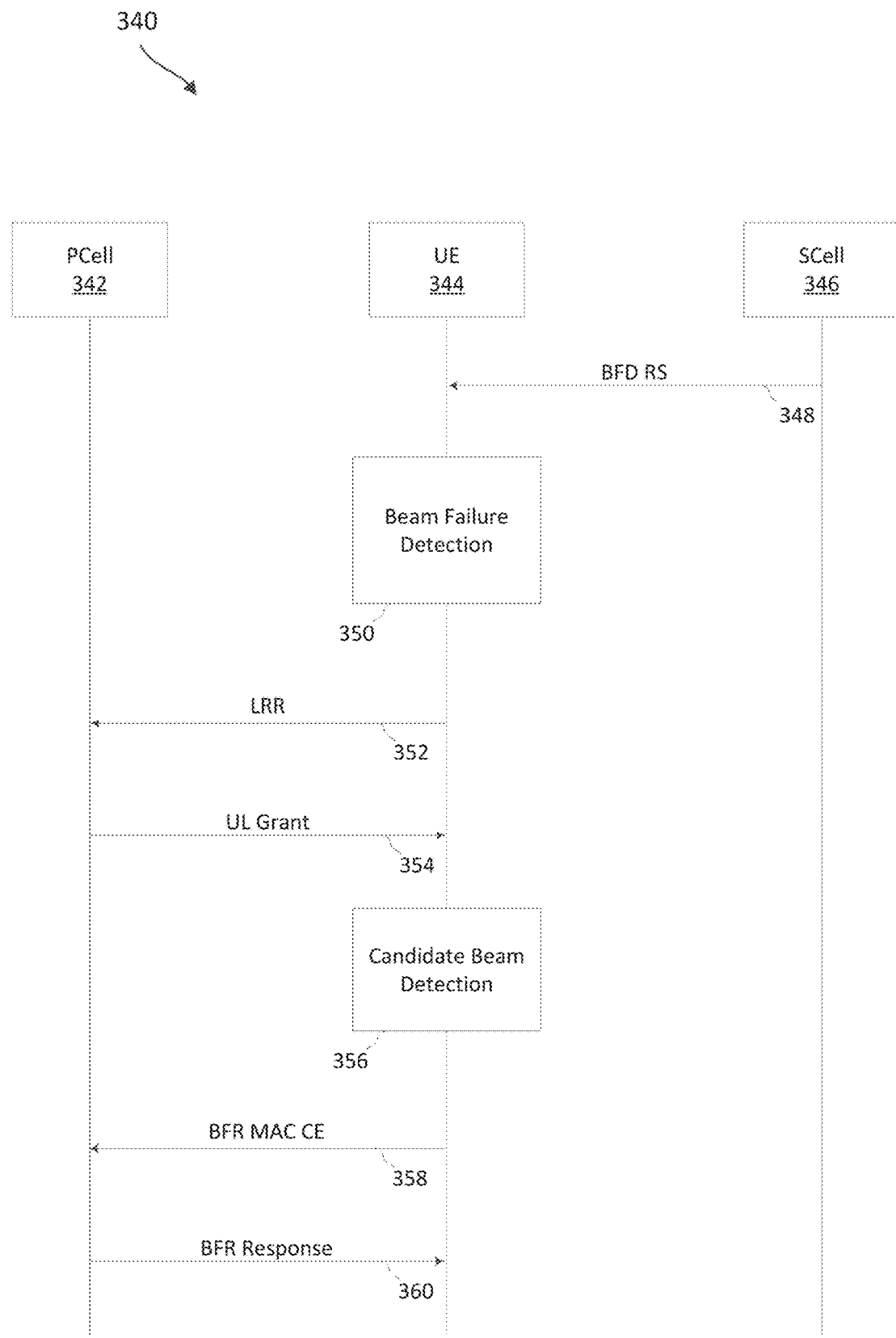
FIG. 3B illustrates an example of a process flow that supports beam failure recovery techniques for multiple transmission-reception points according to some aspects of the present disclosure.

FIG. 3B illustrates another example of a process flow 340 that supports beam failure recovery techniques for multiple beam groups in a secondary cell in accordance with aspects of the present disclosure. In some examples, process flow 340 may implement aspects of wireless communications system 100 or 200. Process flow 340 may be implemented by a UE 344 and a PCell 342 and a Scell 346, where the Scell 346 may have multiple values of CORESET pool index values (and is served by multiple different TRPs) as described herein. In the following description of the process flow 340, the communications between the UE 344, the Pcell 342, and the Scell 346 may be transmitted in a different order than the example order shown, or the operations performed by the UE 344, Pcell 342, and Scell 346 may be performed in different orders or at different times. Some operations may also be omitted from the process flow 340, and other operations may be added to the process flow 340.

In some examples, the operations illustrated in process flow 340 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At a high level, the UE 344 may monitor for BFD RS(s) from the Scell 346, report a BFD of the Scell 346 to the Pcell 342, and perform a BFR (e.g., via a RACH procedure) for the Scell 346 via the Pcell 342.

At communications 348, the Scell 346 may transmit, and UE 344 may receive, one or more BFD reference signals of a set of BFD reference signals. In this regard, the UE 344 may be monitoring for the BFD reference signals based on a beam group BFD parameter or a cell-level BFD parameter. The UE 344 may measure one or more channel metrics of the BFD reference signals as part of a BFD process. In accordance with various aspects, the BFD reference signals may be transmitted by different TRPs, and have multiple CORESET pool index values, and the BFD reference signals have an indication of the associated CORESET pool index value (e.g., zero or one, based on a reference signal sequence that is configured to a CORESET pool index value).

At step 350, the UE 344 may determine that a beam failure is detected at the Scell 346. In some cases, similarly as discussed with reference to FIGS. 2B and 3A above, the detection of the BFD may be based on a channel metric of the reference signal (the BFD RS(s) received at communication 348) being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. If the BFD reference signals are not configured, the reference signal sets indicated by the active TCI states of CORESETs monitored by the UE 344 may be used. If, for an active TCI state of a CORESET, there are multiple reference signal indices, the one with QCL-TypeD is preferentially used. Otherwise, QCL-TypeA, QCL-TypeB, or QCL-TypeC can be used. The physical layer in the UE 344 may assess the radio link quality according to the BFD set against the threshold value (e.g., $Q_{out}$). If radio link quality is worse than $Q_{out}$ for all the reference signals in the BFD resource set, the UE 344 may declare a beam failure.

In one example, two sets of failure detection resources may be configured, each corresponding to a different CORESET pool index value. In another example, each resource within the failure detection resources used to transmit the BFD reference signals may be configured with a CORESET pool index value. In some cases, if a resource is not configured with a CORESET pool index value, it is assumed to be associated with CORESET pool index value zero. In some cases, a BFD reference signal resource may be configured with both values of CORESET pool index, in which case the associated reference signal may be considered for both TRPs. In some cases, when failure detection resources are not configured, reference signal sets indicated by the active TCI states of CORESETs configured with CORESET pool index zero or one determines the first and second sets of resources, respectively. In some cases, a beam failure for a value of CORESET pool index may be declared when radio link quality is worse than the configured threshold value (e.g., $Q_{out}$) for all the reference signals in the BFD resources that are associated with that CORESET pool index value.

At communications 352, the UE 344 may initiate a BFR based on a beam group BFD parameter or a cell-level BFD parameter. For example, the UE 344 may transmit a link recovery request (LRR) or other BFR request on the Pcell 342. In some cases, the recovery request may be transmitted on a Pcell, on a primary Scell (Pscell), or on a Scell that is configured for PUCCH (a PUCCH-Scell) in which PUCCH BFR is configured. The LRR may indicate that the UE 344 is requesting uplink resources (e.g., similar to a scheduling request (SR), and may use PUCCH format 0 or 1. In some cases, two PUCCH resources can be configured for LRR (e.g., indicated by schedulingRequestID-BFR-Scell) by two corresponding scheduling request IDs. The PUCCH resources or scheduling request IDs may be associated with the values of CORESET pool index. If BFD is declared for a value of CORESET pool index in Scell 346, in some cases, the PUCCH resource/scheduling request ID that corresponds to another value of CORESET pool index may be used for LRR transmission. Such a selection of resources provides that if the beams of Scell 346 and a PUCCH-cell are the same, and if all beams for one TRP become weak, LRR can be transmitted using a beam corresponding to the other TRP. Such a rule may be applied, for example, when the CC with PUCCH-BFR is in the same band as the Scell 346.

In other cases, the PUCCH resource/scheduling request ID that corresponds to the same value of CORESET pool index is used for LRR transmission. Such a selection may provide that LRR is transmitted to the same TRP for non-ideal backhaul scenario. Such a rule may be followed, for example, when separate feedback is configured for different cells (ACKNACKFeedbackMode=Separate-Feedback). In other cases, the PUCCH resource/scheduling request ID that corresponds to CORESET pool index=0 is used for LRR transmission. Such a rule can be followed, for example, when the CC with PUCCH-BFR is in a different band than the Scell 346. In still other cases, multiple PUCCH resources/scheduling request IDs may be used to transmit LRR irrespective of the CORESET pool index for which BFD is declared. This means that multiple instances of the LRR transmission are provided across the multiple PUCCH resources (and transmitted to both TRPs).

At communication 354, the Pcell 342 may provide an uplink grant to the UE 344. Such an uplink grant may be a normal uplink grant with C-RNTI/MCS-C-RNTI that can serve as response to LRR, which the UE 344 may use to transmit a PUSCH in which a BFRQ MAC-CE can be transmitted. It is noted that in some cases the UE 344 may have an existing uplink grant, in which cases the LRR and associated uplink grant operations may be skipped.

At step 356, the UE 344 may perform a CBD procedure. Before sending the MAC-CE with the beam failure recovery message, the UE 344 may first identify one or more candidate beams for the failed Scell 346. The CBD process may be performed in a similar manner as discussed with reference to FIG. 3A and FIG. 2B above, with the exception that the procedure is for Scell 346. In some cases, up to 64 resources (e.g., indicated in RRC in candidateBeamRSS-CellList-r16), which can be transmitted on the failed Scell 346 or another CC in the same band. In some cases, each candidate beam is associated with a CORESET pool index value. In one example, two lists of candidate beams may be provided (e.g., two lists for parameter candidateBeamRSS-CellList-r16 are configured) each corresponding to a CORESET pool index value. In another example, each reference signal in the list of candidate beams (e.g., in candidateBeamRSSCellList-r16) may be configured with a CORESET pool index value. In some cases, if a reference signal is not configured with a CORESET pool index value, it is assumed to be associated with CORESET pool index value zero. In addition, it can be allowed for a reference signal to be configured with both values of CORESET pool index, in which case it is considered for both TRPs. In some instances, when BFD is declared for a value of CORESET pool index, a candidate beam may be identified only within reference signals that are associated with the same value of CORESET pool index.

At communication 358, the UE 344 may transmit a beam failure recovery message in a BFR MAC-CE (a BFRQ). Examples of the BFR MAC-CE are discussed further below. The BFR MAC-CE can be transmitted using the resources provided in the uplink grant, and can be sent on any cell, including failed SCell 346 in some instances. In some cases, the UE 344 may indicate the CORESET pool index value in the Scell MAC-CE for the corresponding Scell 346. Such an indication may be provided, in some cases, in accordance with the examples discussed further below.

At communication 360, the Pcell 342 may provide a BFR response to the UE 344 based on a beam group BFD parameter or a cell-level BFD parameter. In some cases, the response may be an uplink grant to schedule a new transmission (e.g., with a toggled new data indicator (NDI)) for the same HARQ process as the PUSCH carrying the BFR MAC-CE. In some cases, if a new beam corresponding to a value of CORESET pool index in the Scell 346 is reported in the BFR MAC-CE, after 28 symbols from the end of the BFR response (end of PDCCH), the UE 344 may use a QCL assumption that only the CORESETs with the same value of CORESET pool index are reset to the new beam (e.g., $q_{new}$) in the Scell 346. Assuming that PUCCH resources are also associated with a value of CORESET pool index, spatial relation for only those PUCCH resources that are associated with the same value of CORESET pool index are reset to the new beam in the Scell 346 when the Scell 346 is a PUCCH-Scell. If PUCCH resources are not associated with a value of CORESET pool index, and if BFR MAC-CE indicates BFD and candidate beams for both values of CORESET pool index (e.g., two $q_{new}$ in the Scell 346), PUCCH beams are reset to the candidate beam corresponding to CORESET pool index=0 (when Scell is PUCCH-Scell).

Thus, in some cases, the UE 344 may reset the beams for one or more PUCCH resources associated with the same value as the CORESET pool index value of the identified candidate beam, when the secondary cell is configured for uplink control information transmissions. Further, in some cases, the UE 344 may reset the beams for one or more PUCCH resources in response to the CORESET pool index value of the identified candidate beam having a first value (e.g., CORESET pool index=0), and refrain from resetting the beams for the one or more PUCCH resources in response to the CORESET pool index value of the identified candidate beam having a second value (e.g., CORESET pool index=1), when the secondary cell is configured for uplink control information transmissions.

Figure 3C:
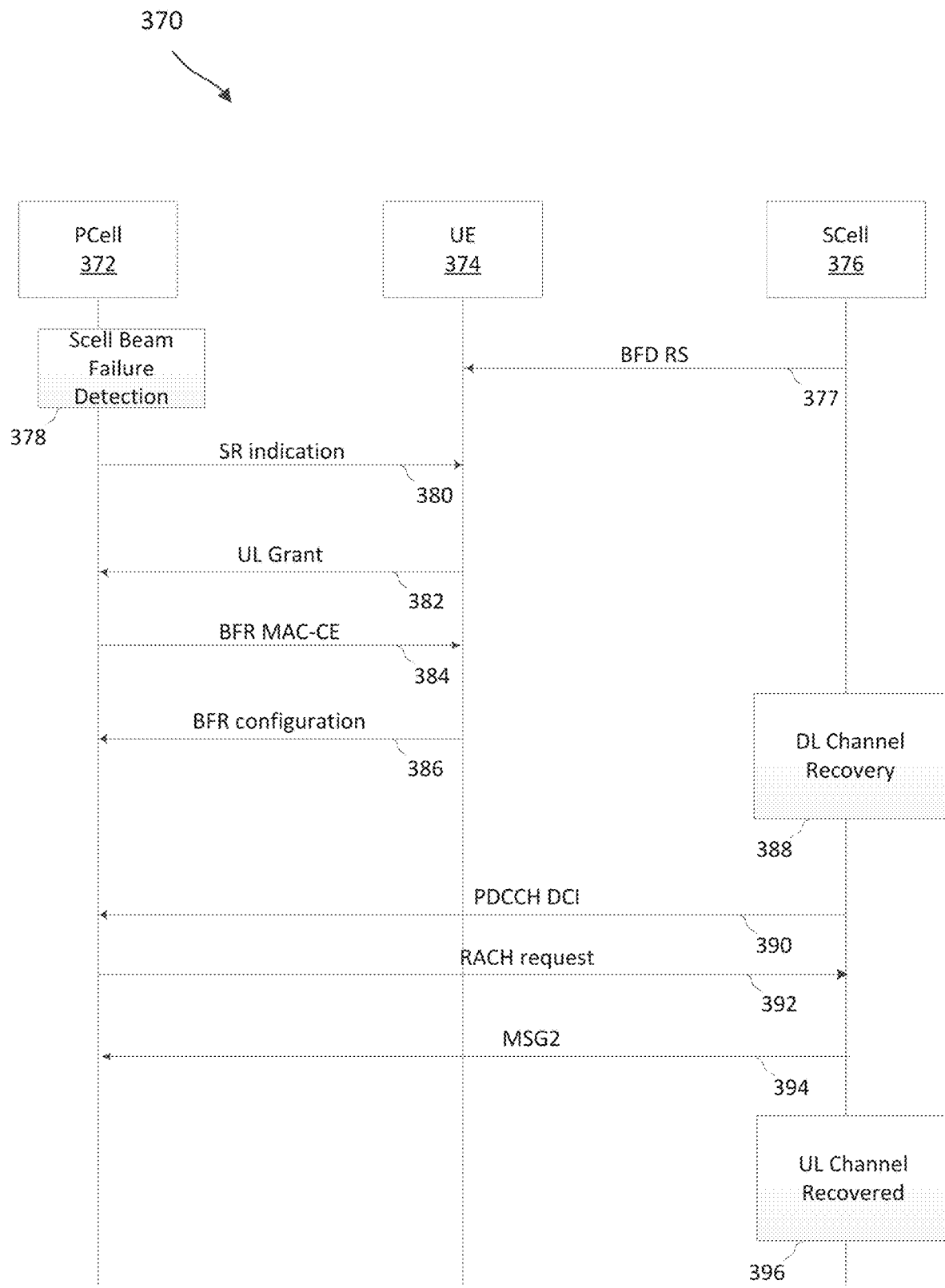
FIG. 3C further illustrates aspects of beam failure recovery according to some aspects of the present disclosure.

FIG. 3C illustrates another example process flow 370 for beam failure recovery techniques for multiple beam groups in a secondary cell in accordance with aspects of the present disclosure. In some examples, process flow 370 may implement aspects of wireless communications system 100 or 200. Process flow 370 may be implemented by a UE 372 and a Pcell 374 and a Scell 376, where the Scell 376 may have multiple values of CORESET pool index values (and is served by multiple different TRPs) as described herein. In some aspects, the Pcell 372 may operate over a carrier frequency in a frequency range 1 (FR1), and the Scell 376 may operate over a carrier frequency in a frequency range 2 (FR2). FR1 may refer to sub-6 GHz frequencies (e.g., between about 4 GHz to about 7 GHz), and FR2 may refer to mmWave frequencies (e.g., between about 24 GHz to about 52 GHz). In the following description of the process flow 370, the communications between the UE 372, the Pcell 374, and the Scell 376 may be transmitted in a different order than the example order shown, or the operations performed by the UE 372, Pcell 374, and Scell 376 may be performed in different orders or at different times. Some operations may also be omitted from the process flow 370, and other operations may be added to the process flow 370.

In some examples, the operations illustrated in process flow 340 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

The process flow 370 may be substantially similar to the process flow 340. For instance, the UE 344 may monitor for BFD RS(s) 377 from the Scell 376 and report a BFD of the Scell 376 to the Pcell 374. However, in the process flow 370, the UE 372 may perform a RACH procedure with the Scell 376 instead of the Pcell 374 to complete a BFR for the Scell 376.

At step 378, the UE 372 may determine that a BFD is detected at the Scell 376. In some cases, similarly as discussed with reference to FIGS. 2B, 3A, and 3B above, the detection of the BFD may be based on a channel metric of the reference signal (e.g., BFD RS(s) 377 received from the Scell 376 as discussed above with respect to communication 348 of FIG. 2B) being below a threshold value (e.g., $Q_{out}$). In some cases, the BFD may be based on periodic CSI-RS resources configured by RRC (e.g., configured by RRC parameter failureDetectionResources). In some cases, the BFD reference signals may include up to two reference signals on a single port. If the BFD reference signals are not configured, the reference signal sets indicated by the active TCI states of CORESETs monitored by the UE 374 may be used. If, for an active TCI state of a CORESET, there are multiple reference signal indices, the one with QCL-TypeD is preferentially used. Otherwise, QCL-TypeA, QCL-TypeB, or QCL-TypeC can be used. The physical layer in the UE 374 may assess the radio link quality according to the BFD set against the threshold value (e.g., $Q_{out}$). If radio link quality is worse than $Q_{out}$ for all the reference signals in the BFD resource set, the UE 374 may declare a beam failure.

In one example, two sets of failure detection resources may be configured, each corresponding to a different CORESET pool index value. In another example, each resource within the failure detection resources used to transmit the BFD reference signals may be configured with a CORESET pool index value. In some cases, if a resource is not configured with a CORESET pool index value, it is assumed to be associated with CORESET pool index value zero. In some cases, a BFD reference signal resource may be configured with both values of CORESET pool index, in which case the associated reference signal may be considered for both TRPs. In some cases, when failure detection resources are not configured, reference signal sets indicated by the active TCI states of CORESETs configured with CORESET pool index zero or one determines the first and second sets of resources, respectively. In some cases, a beam failure for a value of CORESET pool index may be declared when radio link quality is worse than the configured threshold value (e.g., $Q_{out}$) for all the reference signals in the BFD resources that are associated with that CORESET pool index value.

At communication 380, in response to the detecting the BFD at the Scell 376, the UE 372 transmits an SR indication to the Pcell 374 (over an FR1 frequency carrier of the Pcell 374) via a scheduling request (SR). In some aspects, the UE 372 may transmit the SR over a PUCCH resource, for example, using a PUCCH format 0 or a PUCCH format 1. The SR indication may request the Pcell 374 to provide the UE 372 with PUSCH resources, which may be used by the UE 372 to transmitting a BFRQ for the Scell 376. In other words, the UE 372 may determine to initiate a BFR for the Scell 376 by transmitting the SR indication.

In some aspects, the UE 372 may initiate a BFR for the Scell 376 based on a beam group BFD parameter or a cell-level BFD parameter. The SR indication may indicate that the UE 344 is requesting uplink resources, which the SR indication may be transmitted using a PUCCH resource. In some cases, two PUCCH resources can be configured for requesting BFR for the Scell 376 (e.g., indicated by schedulingRequestID-BFR-Scell) by two corresponding scheduling request IDs. The PUCCH resources or scheduling request IDs may be associated with the values of CORESET pool index. If BFD is declared for a value of CORESET pool index in Scell 376, in some cases, the PUCCH resource/ scheduling request ID that corresponds to another value of CORESET pool index may be used for LRR transmission. Such a selection of resources provides that if the beams of Scell 376 and a PUCCH-cell are the same, and if all beams for one TRP become weak, the SR indication (the BFR request for the Scell 376) can be transmitted using a beam corresponding to the other TRP. Such a rule may be applied, for example, when the CC with PUCCH-BFR is in the same band as the Scell 376.

In other cases, the PUCCH resource/scheduling request ID that corresponds to the same value of CORESET pool index is used for the SR indication transmission. Such a selection may provide that the SR indication is transmitted to the same TRP for non-ideal backhaul scenario. Such a rule may be followed, for example, when separate feedback is configured for different cells (ACKNACKFeedback-Mode=SeparateFeedback). In other cases, the PUCCH resource/scheduling request ID that corresponds to CORESET pool index=0 is used for SR indication (the BFR request for the Scell 376) transmission. Such a rule can be followed, for example, when the CC with PUCCH-BFR is in a different band than the Scell 376. In still other cases, multiple PUCCH resources/scheduling request IDs may be used to transmit the SR indication irrespective of the CORESET pool index for which BFD is declared. This means that multiple instances of the SR indication transmission are provided across the multiple PUCCH resources (and transmitted to both TRPs).

At communication 382, the Pcell 374 may provide an uplink grant to the UE 372. Such an uplink grant may be a normal uplink grant with C-RNTI/MCS-C-RNTI that can serve as response to the SR indication (the BFR request for the Scell 376), which the UE 372 may use to transmit a PUSCH in which a BFRQ MAC-CE can be transmitted. It is noted that in some cases the UE 344 may have an existing uplink grant, in which cases the LRR and associated uplink grant operations may be skipped.

At communication 384, the UE 372 may transmit a beam failure report indicating a BFD at the Scell 376 in a BFR MAC-CE (a BFRQ). Examples of the BFR MAC-CE are discussed further below. The BFR MAC-CE is transmitted using the resources provided in the uplink grant, and can be sent on any cell, including failed SCell 376. In some cases, the UE 372 may indicate the CORESET pool index value in the Scell MAC-CE for the corresponding Scell 376. In general, the UE 372 may indicate a beam failure and a desired or candidate beam for recovery. Such an indication may be provided, in some cases, in accordance with the examples discussed further below.

At communication 386, the Pcell 374 may provide a BFR configuration to the UE 372 for performing a BFR for the Scell 376. The FR configuration may indicate a new CORESET with a TCI State Activation for Scell 376 in a PUCCH TCI update. In some aspects, the BFR configuration may be based on a beam group BFD parameter or a cell-level BFD parameter. In some cases, the response may be an uplink grant to schedule a new transmission (e.g., with a toggled new data indicator (NDI)) for the same HARQ process as the PUSCH carrying the BFR MAC-CE. In some cases, if a new beam corresponding to a value of CORESET pool index in the Scell 346 is reported in the BFR MAC-CE, after 28 symbols from the end of the BFR response (end of PDCCH), the UE 344 may use a QCL assumption that only the CORESETs with the same value of CORESET pool index are reset to the new beam (e.g., $q_{new}$) in the Scell 346. Assuming that PUCCH resources are also associated with a value of CORESET pool index, spatial relation for only those PUCCH resources that are associated with the same value of CORESET pool index are reset to the new beam in the Scell 346 when the Scell 346 is a PUCCH-Scell. If PUCCH resources are not associated with a value of CORESET pool index, and if BFR MAC-CE indicates BFD and candidate beams for both values of CORESET pool index (e.g., two $q_{new}$ in the Scell 346), PUCCH beams are reset to the candidate beam corresponding to CORESET pool index=0 (when Scell is PUCCH-Scell).

Thus, in some cases the UE 344 may reset the beams for one or more PUCCH resources associated with the same value as the CORESET pool index value of the identified candidate beam, when the secondary cell is configured for uplink control information transmissions. Further, in some cases, the UE 344 may reset the beams for one or more PUCCH resources in response to the CORESET pool index value of the identified candidate beam having a first value (e.g., CORESET pool index=0), and refrain from resetting the beams for the one or more PUCCH resources in response to the CORESET pool index value of the identified candidate beam having a second value (e.g., CORESET pool index=1), when the secondary cell is configured for uplink control information transmissions.

At step 388, the Scell 376 may perform DL channel recovery and the DL channel may be recovered.

At communication 390, the Scell 376 may provide the UE 372 with a PDCCH DCI (e.g., transmitted via a FR2 frequency of the Scell 376. The PDCCH DCI may be transmitted based on a C-RNTI of the UE 372. The PDCCH DCI may indicate a resource for the UE 372 to transmit a RACH request (e.g., a RACH preamble or MSG1).

At communication 392, upon receiving the PDCCH DCI, the UE 372 may transmit a RACH request using the resource indicated by the PDCCH DCI received at communication 390.

At communication 394, upon receiving the RACH request, the Scell 376 may respond with MSG2. In some aspects, the MSG2 may indicate a scheduling grant for the UE 372 to transmit a UL communication. At which point, Scell UL channel is recovered at step 396.

The BFD and BFR procedures discussed herein can be executed on UEs and BSs implemented in the networks illustrated in FIG. 1 and FIG. 2A. Consequently, FIG. 4 illustrates an example UE 400 and FIG. 5 illustrates an example BS 500 according to some embodiments as discussed herein.

Figure 4:
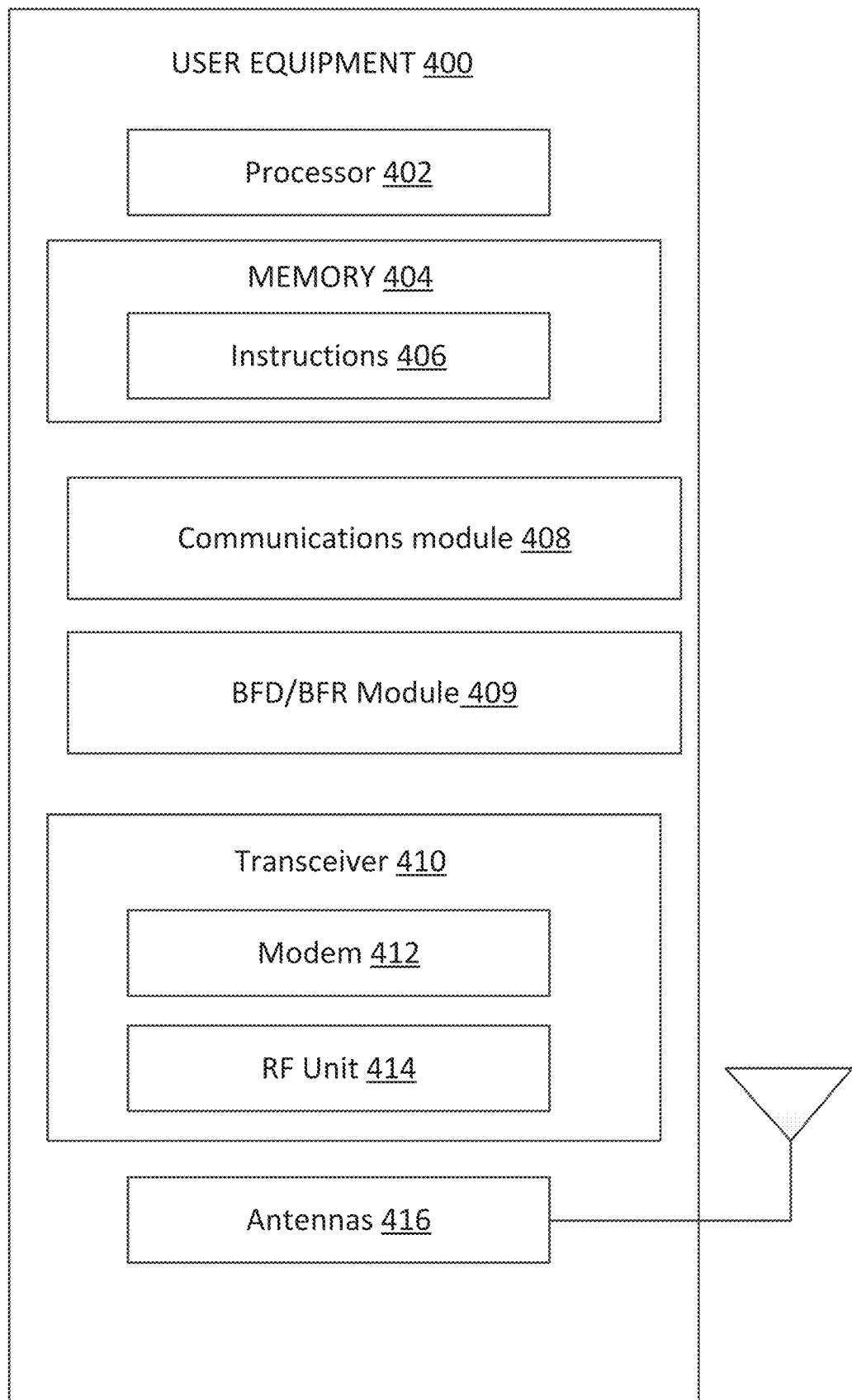
FIG. 4 is a block diagram of an exemplary user equipment (UE) according to some aspects of the present disclosure.
Figure 5:
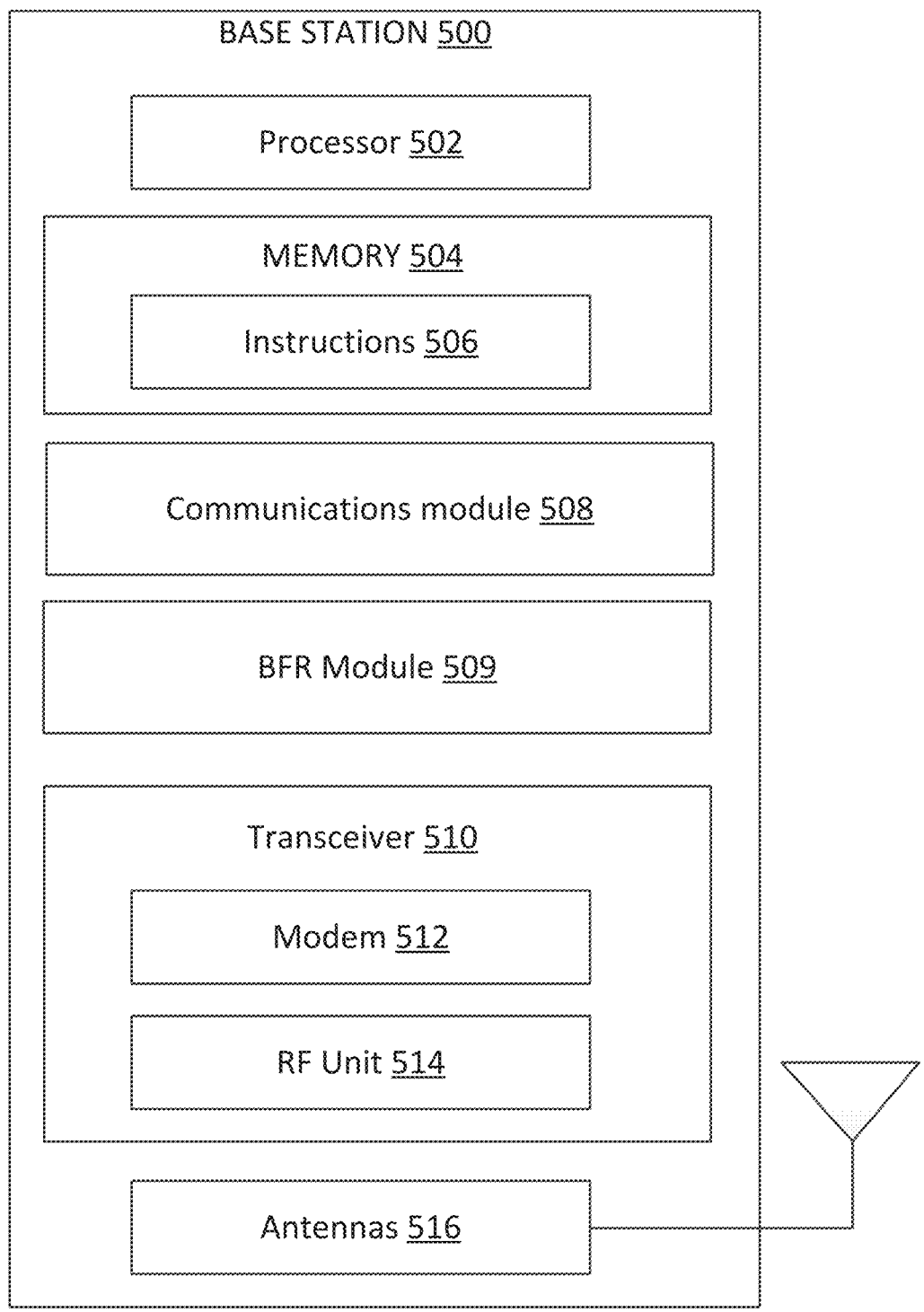
FIG. 5 is a block diagram of an exemplary base station (BS) according to some aspects of the present disclosure.

FIG. 4 is a block diagram of an exemplary UE 400 according to some aspects of the present disclosure. The UE 400 may be a UE 115, 205, 310, 344, 372 as discussed above in FIGS. 1, 2A, 3A, 3B, and 3C. As shown, the UE 400 may include a processor 402, a memory 404, communications module 408, a BFD/BFR module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 2A-2B, 3A-3C, 6-10. Instructions 406 may also be referred to as program code. The program code may be for causing a wireless communication device to perform these operations, for example by causing one or more processors (such as processor 402) to control or command the wireless communication device to do so. The terms "instructions" and "code"

should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Communications module 408, through transceiver 410, may establish a connection with at least a first beam group (e.g. TRP) using a first set of one or more beams and a second beam group (e.g. TRP) using a second set of one or more beams, where each of the first beam group and the second beam group are associated with a secondary cell of UE 400. In general, communications module 408, through transceiver 410, may establish a connection with multiple beam groups (e.g. mTRPs).

Communications module 408 may, as described herein, be implemented to realize one or more potential advantages. One implementation may allow the UE 408 to provide BFD indications and candidate beams for particular TRPs in a serving cell that uses multiple TRPs, which may enhance the overall channel quality of the network performance and allow for indication of failed beams of particular TRPs before an overall failure of the serving cell. Further, such implementations may allow UE 408 to increase communications reliability, throughput, and user experience, while reducing overall power consumption, among other advantages.

Communications module 408 may be implemented in hardware, code (e.g., software or firmware) executed by a processor, or any combination thereof. If implemented in code executed by a processor, the functions of the communications module 408, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. In particular, communications module 408 may be implemented on processor 402.

The BFD/BFR module 409 may be implemented via hardware, software, or combinations thereof. For example, the BFD/BFR module 409 may be implemented as a processor, circuit, and/or instructions 406 stored in the memory 404 and executed by the processor 402. In some instances, the BFD/BFR module 409 can be integrated within the modem subsystem 412 and communications module 408. For example, the BFD/BFR module 409 can be implemented by a combination of software components (e.g., executed by a DSP or a general processor) and hardware components (e.g., logic gates and circuitry) within the modem subsystem 412.

The BFD/BFR module 409 may be used for various aspects of the present disclosure, for example, aspects of aspects of FIGS. FIGS. 2A-2B, 3A-3C, 6-10. The BFD/BFR module 409 is configured to perform beam failure detection (BFD) and beam failure recovery (BFR) techniques based on a beam group parameter(s) and/or a cell-level parameter(s) as described herein. In particular, BFD/BFR module 409 determines and declares a beam failure for beams in a group of beams used with communications module 408 based on a channel metric associated with one or more beams dropping below a threshold criteria, select, responsive to the determining to declare the beam failure, one or more of a first uplink control resource associated with the first transmission-reception point or a second uplink control resource associated with the second transmission-reception point for transmission of a recovery request message, and transmit the recovery request message via the selected uplink control resource. The BFD/BFR module 409, with communications module 408, may transmit a beam failure recovery message to one of the multiple beam groups that indicates the failed beam and candidate replacement beams. Aspects of operation of the BFD/BFR module 409 is further discussed below. As further discussed below BFD/BFR module 409 further provides a beam failure configuration for a service cell according to considerations as discussed further below.

In some aspects, the BFD/BFR module 409 may communicate with components of the UE 400 and configured to detect a beam failure of at least one beam of a beam group, trigger a beam failure recover (BFR) in response to the detection of the beam failure of the at least one beam of the beam group, generate a BFR medium access control-control element (MAC-CE) that includes BFR information associated with the beam group, and transmit the BFR MAC-CE that includes the BFR information associated with the beam group using a transmission resource. In some instances, the BFD/BFR module 409 may determine one or more replacement beam candidates from the beam group and determine the transmission resource used for transmitting the BFR MAC-CE.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the communication module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH control information, PRACH signals, PUSCH data, SR indication, BFR request, MSG1, BFR MAC-CE) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., SSBs, RMSI, MIB, SIB, PRACH configuration, PDCCH, PDSCH, MSG2, UL grants, RRC configurations, BFD configurations, BFR configurations) to the communication module 408 for processing. The antennas 416 may include multiple antennas of similar or different designs in order to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

FIG. 5 is a block diagram of an exemplary BS 500 according to some aspects of the present disclosure. The BS 500 may be a BS 105 in the network 100 as discussed above in FIG. 1, a Pcell/Scell 210, 305, 342, 346, 374, 376 as discussed above in FIGS. 2A, 3A, 3B, and 3C, and/or a TRP 215 as discussed above in FIG. 2A. As shown, the BS 500 may include a processor 502, a memory 504, a communication module 508, a BFR module 509, a transceiver 510 including a modem subsystem 512 and a RF unit 514, and one or more antennas 516. These elements may be in direct or indirect communication with each other, for example via one or more buses, and may, in some cases, be operated on a single processor 502.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2, 3A-3B, 6, and 11. Instructions 506 may also be referred to as code, which may be interpreted broadly to include any type of computer-readable statement(s) as discussed above with respect to FIG. 4.

Communications module 508 may establish communications with a UE such as UE 400 via a serving cell (e.g., primary cell and/or a secondary cell), where communications via the serving cell use multiple beams. For example, a first transmission-reception point of the serving cell may use a first set of one or more beams and a second transmission-reception point of the serving cell may use a second set of one or more beams, configure a first uplink resource associated with the first transmission-reception point and a second uplink resource associated with the second transmission-reception point for transmission of a recovery request message that indicates a beam failure of the serving cell at the UE through BFR module 509, receive the recovery request message from the UE, and determine in BFR module 509, based on the recovery request message, that the UE has declared a beam failure.

Communications module 508, or its sub-components, may be implemented in hardware, code (e.g., software or firmware) executed by a processor, or any combination thereof. If implemented in code executed by a processor, the functions of communications module 508, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

BFR module 509 is coupled with communications module 508 to receive messages from the UE declaring a beam failure. Various aspects of the present disclosure, for example, aspects of aspects of FIGS. 2, 3A-3B, 6, and 11 can be executed in BFR module 509.

In some aspects, the BFD/BFR module 509 may communicate with components of the BS 500 and configured to configure a user equipment (UE) for transmission of a beam failure recovery (BFR) MAC-CE, receive a BFR MAC-CE from the UE, and identify, from the BFR MAC-CE, one or more failed beams and one or more candidate replacement beams.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., SSBs, RMSI, MIB, SIB, PRACH configuration PDCCH, PDSCH, MSG2, UL grants, RRC configurations, BFD configurations, BFR configurations) from the modem subsystem 512 (on outbound transmissions) or of transmissions originating from another source such as a UE 115, the UE 315, and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUCCH control information, PRACH signals, PUSCH data, SR indication, BFR request, MSG1, BFR MAC-CE) to the communication module 508 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

As discussed above, a UE such as UE 115, 205, 310, 344, 372, 400 discussed above in FIGS. 1, 2A, 3A, 3B, 3C, and 4 may communicate with a network (e.g., the network 100 and the system 200) via multiple TRPs (e.g., the TRPs 215)

over one or more component carriers (CC) and may monitor BFD RSs from one or more of the multiple TRPs to perform TRP-specific BFR. Upon detecting a beam failure at one or more of the multiple TRPs, the UE may initiate a BFR procedure with the network, for example, by transmitting a BFR MAC-CE as discussed above in relation to FIGS. 2B, and 3A-3C. However, in accordance with some embodiments, the BFR MAC-CE content and format can depend on the situation (e.g., configurations at the UE). Additionally, the UE may transmit a BFR MAC-CE in a variety of ways to trigger a BFR for one or more of the multiple TRPs. For example, in one embodiment, the UE may transmit the TRP specific BFR MAC-CE in an already scheduled known UL grant. In some examples, the UE may transmit the TRP specific BFR MAC-CE in a random access channel (RACH) using an available operating TRP. In yet another example, the UE may transmit a scheduling request (SR) in PUCCH resource(s) to request a UL grant for transmission of the TRP specific BFR MAC-CE. In some aspects, a TRP specific BFR may be referred to as beam group specific BFR. These examples are discussed further below.

Aspects of the present disclosure are directed to transmission of beam group specific BFR MAC-CEs to a beam failure detection (BFD) process that detects failure of at least one beam of a beam group operating on a serving cell (e.g., SpCell or SCell). The BFD then triggers a beam failure recovery (BFR) procedure that involves the transmission of a group specific BFR MAC-CE providing group specific beam failure information. In some embodiments of this disclosure, the beam group may refer to a TRP in a multi-TRP transmission system and the beam group ID may refer to the TRP ID.

Figure 6A:
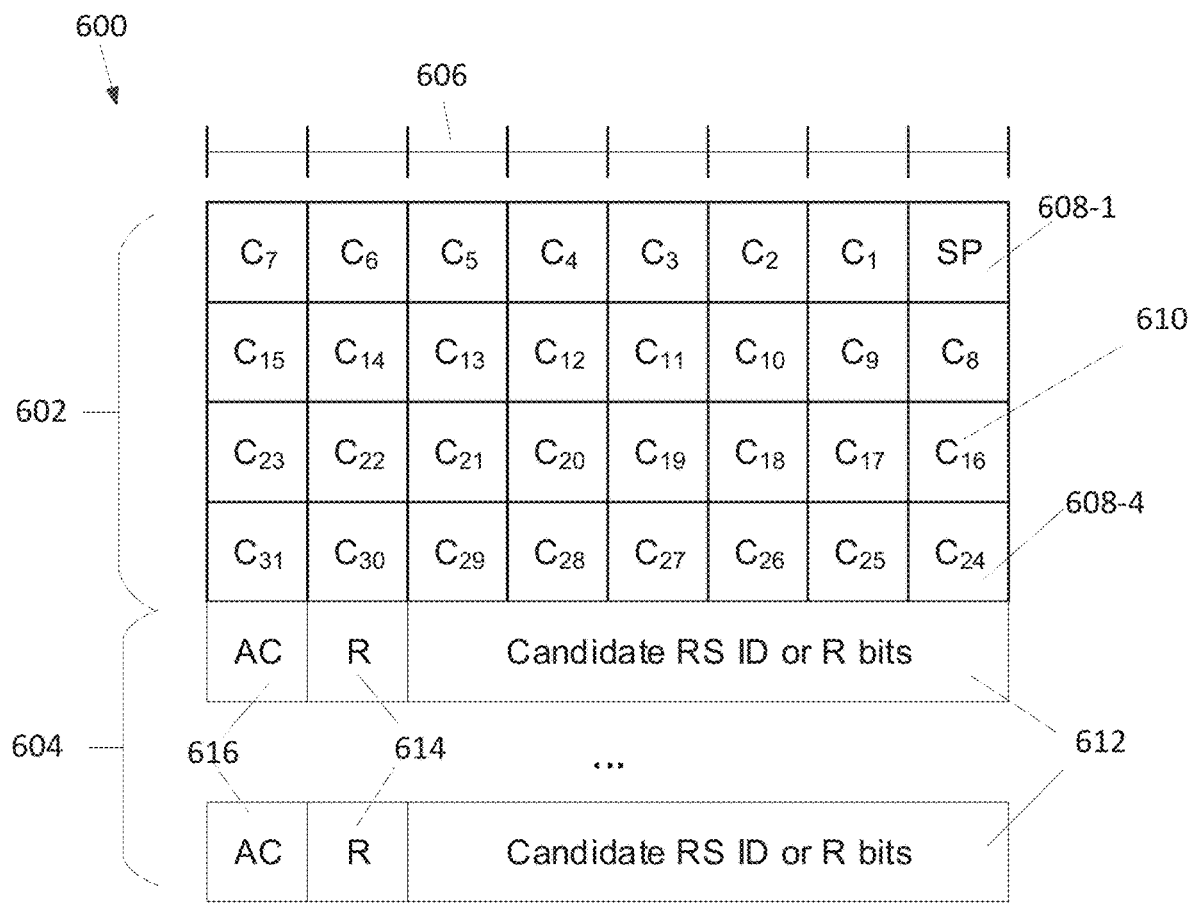
FIG. 6A is a block diagram of an exemplary beam failure recovery (BFR) medium access control-control element (MAC-CE) according to some aspects of the present disclosure.

FIG. 6A is a block diagram of an exemplary BFR MAC-CE 600 according to some aspects of the present disclosure. The BFR MAC-CE 600 may be employed by a UE (e.g., the UE 115, 205, 310, 344, 372, 400) in a network (e.g., the network 100, the system 200) to initiate a beam group specific BFR procedure for specific beam group(s) or specific TRP(s). In some instances, the BFR MAC-CE 600 may also be referred to as a BFRQ message. The UE may transmit the BFR MAC-CE 600 for any beam group or TRP over any CC with a beam failure irrespective of whether UL is configured for or supported by the TRP or beam group.

The BFR MAC-CE 600 may be carried in a MAC layer packet data unit (PDU). The BFR MAC-CE 600 may include information such as a MAC subheader (not shown) associated with the BFR MAC-CE 600 that indicates a logical channel ID (LCD), indices of component carriers (CC) with failed TRPs, the failed beam group ID, candidate RS ID per failed beam group, and corresponding presence flags. Such an arrangement is provided for MAC-CE based TRP-specific BFRQ transmissions. The beam group specific BFR MAC-CE may further include information indicating a beam group ID and may further include a cell ID indicating the serving cell (e.g., PCell, SpCell, or SCell).

In the particular formatting example illustrated in FIG. 6A, beam group specific BFR MAC-CE 600 represents indices of CC in SP/$C_i$ fields arranged in a block 602 of octets with octet fields 606. Such an arrangement supports beam failure recovery for multiple transmission-reception points in a secondary cell in accordance with aspects of the present disclosure. The example shown in FIG. 6A, octet 608-1 in block 602 includes a reserved or spaced field with CC indicators 610 $C_1$ through $C_7$. As is illustrated in the example of FIG. 6A, block 602 includes a number of octets (e.g., 4) to provide indication of the status of each CC indicated. In this particular example, 32 separate fields 606 (or 31 separate fields $C_1$ through $C_{31}$ in addition to the SP field). The SP field can provide a reserved field, and in some cases may be used to indicate whether the whole MAC-CE applies to a particular CORESET pool index value or beam group ID.

In the example beam group specific BFR MAC-CE 600 illustrated in FIG. 6A, SP/$C_i$ field in block 602 includes an SP field and fields $C_1$ through $C_{31}$ that provide indications of Scells. In this example, the illustrated MAC-CE 600 may include information for up to 32 Scells (using SP and all $C_i$ 610 in block 602). In other examples, fewer numbers of Scells may be present, and associated different CORESET pool index values may be present. Multiple octet rows may be configured that include indication of Scells or Scells and CORESET pool index values.

Further illustrated in FIG. 6A is a second block of octets 604 that in the beam group specific MAC-CE may each indicate a candidate reference signal ID or reserve bits 612 or may indicate a failed beam reference signal ID and may also include, a reserved field 614 that in some cases may be used to indicate an associated CORESET pool index value of the candidate BFD RS ID, and an AC field 616 that includes a present flag that indicates the presence of the candidate TRP referred to in the candidate reference signal field 612 and indicates the absence of a failed beam RS. In some cases, a number of additional octets may depend upon how many Scells and candidate beams are reported in the MAC-CE in block 602.

In some examples, the candidate reference signal ID 612 may implicitly indicate the CORESET pool index value (e.g., if the reference signal ID is mapped or otherwise associated with that CORESET pool index value). Such an option may be used in cases where a candidate beam list (e.g., a candidatebeamRSSCellList) contains all reference signals, and separate lists are not configured. In some cases, the candidate reference signal ID 612 may be a third subset of bits of the MAC-CE.

In other cases, if a value of Ci=1 in block 602 for the Scell (indicating that a candidate beam is indicated in the MAC-CE for the Scell), the reserved field 612 in the corresponding octet may be used to indicate the value of CORESET pool index.

In other examples, the entire MAC-CE may correspond to a value of CORESET pool index. In such cases, the SP field in the first octet 608-1 indicates which CORESET pool index value. In such cases, if Ci=1 for an Scell that is not configured with two values of CORESET pool index, the indicated CORESET pool index in the MAC-CE does not apply.

Figure 6B:
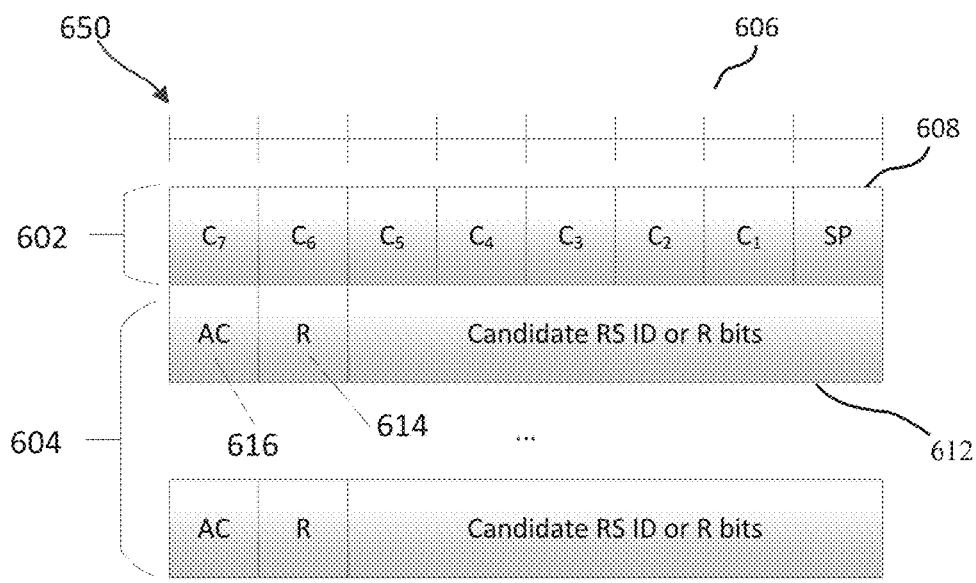
FIG. 6B is a block diagram of an exemplary BFR MAC-CE according to some aspects of the present disclosure.

In further examples, for the Scell, separate Ci fields may indicate BFD/candidate beam that correspond to first or second CORESET pool index values. In such cases, the Ci's may be ordered with respect to a serving cell index of the Scells, as well as with respect to the CORESET pool index values for those Scells configured with two values of CORESET pool index. In some cases, the Ci fields may be first ordered with respect to the serving cell index, and then with respect to the CORESET pool index value. In other cases, the Ci fields may be first ordered with respect to CORESET pool index value, then serving cell index. In this example, the number of Ci fields depends on how many Scells are configured with two values of CORESET pool index. In some cases, different formats of MAC-CE may be used depending upon the number of Scells to be reported, and a first format such as illustrated in FIG. 6B may be used when the number of Ci fields based on above is seven or smaller, and a second format may otherwise be used that includes additional octets that can provide additional Ci fields.

Fields 606 in octet blocks 602 and 604 may be single bit fields or multiple bit fields. In one example, there is one SP/$C_i$ field per CC with X bits indicating per-TRP failure status for the X TRPs configured that that CC. For example, the SP field and $C_i$ field (fields 606) may each have two bits indicating failure per TRP for the two TRPS in SpCell and ith S-Cell in the cell group, respectively. The Candidate RS ID in fields 612 is listed sequentially per failed TRP in each row based on the order in the SP/$C_i$ fields. In that case, the AC field 616 in the same row indicates the presence of candidate with the RS ID with RS value (L1-RSRP) greater than the threshold value that would trigger a BFD.

In a second example, each of fields 606 is a single bit per CC with the 1 bit indicating presence of a failed TRP for that CC. After the SP/$C_i$ fields, in block 604 X rows of octets are listed sequentially per CC with failed TRP to indicate per-TRP failure status for the X TRPs configured for that CC. Each row includes the candidate RS presence flag in AC field 616, corresponding TRP failure or not in R field 614, and candidate RS ID if present in field 612.

In some embodiments of the present invention, the BFR MAC-CE can combine a beam specific BFR MAC-CE with a cell (SpCell or SCell) BFR MAC-CE into a joint BFR MAC-CE when a cell BFR is triggered with the beam group specific BFR. As is discussed in further detail below, one response to detection of a failed beam triggers a cell BFR is transmission of a scheduling request (SR), a joint SR, that is specific to the joint BFR MAC-CE. For instance, if a UE detects at least one cell has a beam group specific (TRP specific) beam failure or a cell level beam failure, the UE may trigger the joint SR. The joint SR is a request for an UL grant for transmission of the joint BFR MAC-CE.

As discussed above, the beam group specific BFR MAC-CE includes beam group specific BFR information regarding beam group ID, failed beam groups, a corresponding cell ID, new candidate beam information, and failed beam information. A cell MAC-CE includes the failed cell ID and new candidate beam recommendations. As such, a format for a beam group specific BFR MAC-CE such as that discussed above with respect to FIG. 6A may differ from a format for a cell BFR MAC-CE.

In some aspects, the joint BFR MAC-CE may have a flexible format that can be either a cell BFR MAC-CE format or a beam group specific BFR MAC-CE format. In either of those cases, formats information for both the beam group specific BFR MAC-CE and the cell BFR MAC-CE is included. In some embodiments, a flag may be used to indicate which format in the flexible format is being used. For instance, the joint BFR MAC-CE may include a flag set to 1 to indicate that the BFR MAC-CE includes a beam group specific BFR MAC-CE or set to 0 to indicate that the BFR MAC-CE includes a cell BFR MAC-CE, or vice versa. In some aspects, a cell level BFR MAC-CE may include failed cell ID(s) (identifying cell(s) with a beam failure) and new candidate beam ID(s) to replace the failed beam(s). In some aspects, a beam group specific (TRP specific) BFR MAC-CE may include failed beam group or TRP ID(s) (identifying beam group(s) or TRP(s) with a beam failure), cell ID(s) corresponding to the failed beam group(s) or TRP(s), and new candidate beam ID(s) to replace the failed beam(s).

In some aspects, the joint BFR MAC-CE may have a fixed format to include information from the beam group specific BFR MAC-CE and/or the cell BFR MAC-CE depending on which type(s) of BFR is configured at the UE for that cell. For instance, if the UE is configured to perform a beam group specific BFR, the UE may transmit BFR MAC-CE according to a beam group specific BFR MAC-CE format (e.g., including failed beam group ID(s), corresponding cell ID(s), and new candidate beam ID(s)). Alternatively, if the UE is configured to perform a cell level BFR, the UE may transmit BFR MAC-CE according to a cell level BFR MAC-CE format (e.g., including failed cell ID(s) and new candidate beam ID(s)). In some aspects, the UE may be configured to perform both beam group specific BFR and cell level BFR. In that case, the joint BFR MAC-CE indicates the cell ID, cell beam failure IDs, candidate beam IDs, beam group IDs as discussed above.

In some aspects, assuming each service cell can be configured for either a cell BFR (a SpCell/SCell BFR) or a beam group specific or TRP specific BFR, the joint BFR MAC-CE can have a fixed format carrying BFR information for every cell based on its configured BFR type. For example, using the format of FIG. 6A as an example, as discussed above each SP/$C_i$ fields in block 602 indicates one CC and uses X bits with X depending on which BFR type is configured for that CC. For example, if the CC is configured for a cell BFR then X=1 and each SP/$C_i$ indicates whether the cell associated with that field fails or not. If the CC is configured with beam group specific BFR, then X bits can map to X beam groups (or TRPs) for that CC to indicate whether each beam group has failed or has not failed. In either case, candidate RS IDs (e.g., beam IDs) for failed beam groups or cells is listed sequentially in the rows of block 604 based on the order of failed beam group or cell indicators in the SP/$C_i$ fields. The AC fields 616 in each row of block 604 indicates whether the row includes a RS ID or a candidate beam (i.e. with a measured L1-RSRP>a threshold). In some aspects, a beam group specific (or TRP specific) BFR MAC-CE may also include a joint TRP specific BFR and cell level BFR MAC-CE as discussed.

As discussed above, the BFR MAC-CE 600 may be a joint BFR MAC CE or a beam group specific BFR MAC-CE. The BFR MAC-CE 600 may have two formats: a non-truncated format as illustrated in FIG. 6A; and a truncated format as illustrated in FIG. 6B.

FIG. 6B is a block diagram of an exemplary BFR MAC-CE 650 according to some aspects of the present disclosure. The BFR MAC-CE 650 can be substantially similar to the BFR MAC-CE 600, but has a truncated format. As illustrated in FIG. 6B, the format of BFR MAC CE 650 includes one octet of SP/$C_i$ fields in block 602. The size of block 604 is then determined by the number of TRP failures indicated in the SP/$C_i$ fields of block 602.

For each of the formats of the example of BFR MAC-CE illustrated in FIG. 6A and FIG. 6B, there may be a total of eight SP/$C_i$ fields if no more than 8 serving cells are configured in the cell group, otherwise there may be up to 32 total SP/$C_i$ fields as illustrated in FIG. 6A. The truncated format BFR MAC-CE 650 is used, for example if the UE receives a UL grant with a grant size (e.g., a PUSCH resource size) that cannot accommodate transmission of the larger BFR MAC-CE 600. In some aspects, the truncated BFR MAC-CE 650 can be include a total of 8 SP/$C_i$ fields instead of the full 32 fields to identify beam failures for the SpCell. In some aspects, the number of octets in block 604 can be maximized, while not exceeding the available grant size for the transmission. For instance, if the UE is given a UL grant with a grant size that can accommodate the transmission of a BFR MAC-CE with 16 SP/$C_i$ fields, the UE may transmit a BFR MAC-CE with 16 SP/$C_i$ fields. For example, the block 602 can include two rows of SP/$C_i$ fields instead of one row of SP/$C_i$ fields as shown in FIG. 6B. Similarly, candidate RS IDs (e.g., beam IDs) for failed beam groups or cells is listed sequentially in the rows of block 604 based on the order of failed beam group or cell indicators in the SP/$C_i$ fields (within the block 602).

Figure 7:
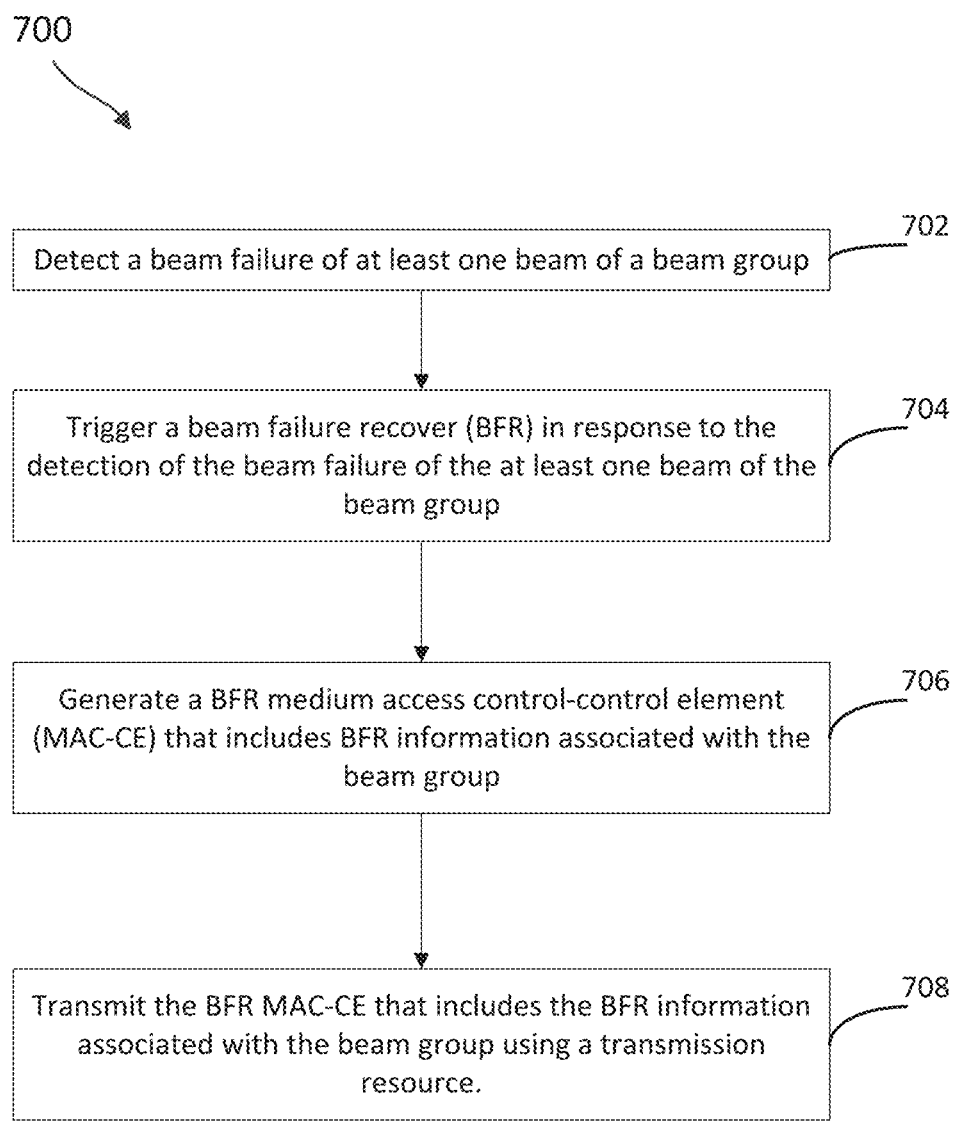
FIG. 7 is a flow diagram of a beam failure detection (BFD)/BFR method according to some aspects of the present disclosure.

FIG. 7 is a flow diagram of a beam failure detection (BFD)/BFR method 700 according to aspects of the present disclosure. Aspects of the method 700 can be executed by a UE, such as the such as UE 115, 205, 310, 344, 372, 400 discussed above in FIGS. 1, 2A, 3A, 3B, 3C, and 4. A UE may comprise a processor, processing circuit, and/or any other suitable component or means for performing the steps. For example, a UE 400 may utilize one or more components, such as the processor 402, the memory 404, the communication module 408, the BFD/BFR module 409, the transceiver 410, the modem 412, and the one or more antennas 416, to execute the steps of method 700. In some aspects, the method 700 may employ mechanisms discussed above with respect to FIGS. 1-6. As illustrated, the method 700 includes a number of enumerated steps, but aspects of the method 700 may include additional steps before, after, and in between the enumerated steps. In some aspects, one or more of the enumerated steps may be omitted or performed in a different order.

At block 702, the UE detects a beam failure of at least one beam of a beam group. In some aspects, the UE may perform a beam failure detection process for one or more beams in a group of beams or perform a cell (SpCell/SCell) beam failure detection for a cell. In some aspects, the UE may be configured to monitor certain BFD RSs for BFD. For instance, the UE may receive BFD RS(s) from multiple TRPs (associated with multiple beam groups) and detect the beam failure based on a received signal measurement (e.g., L1-RSRP) being below a certain threshold.

At block 704, in response to the detection of the beam failure of the at least one beam of the beam group, the UE triggers a BFR process, for example, as discussed above in relation to FIGS. 2A, 3A-3C. In some aspects, the BFR process may be a beam specific BFR process. In some aspects, the BFR process may be a cell level BFR process.

In some aspects, the UE determines one or more replacement beam candidates from the beam group, for example, using similar mechanisms as discussed above in relation to step 325 of FIG. 3A and step 356 of FIG. 3B.

At block 706, the UE generates a BFR MAC-CE that includes BFR information associated with the beam group where the beam failure is detected, for example, as discussed above with respect to FIGS. 6A-6B. In some aspects, the UE may generate the BFR MAC-CE using a flexible format that can support the group-specific BFR information or cell BFR information, and may set a value of an indicator in the BFR MAC-CE to indicate whether the BFR MAC-CE includes the group-specific BFR information or the cell BFR information. In some aspects, the group-specific BFR information includes a transmission-reception point (TRP) identifier, a cell identifier, and at least one replacement beam candidate, and the cell BFR information includes a cell identifier and at least one replacement beam candidate.

In some aspects, the BFR information may include group-specific BFR information and cell BFR information. In some aspects, the UE may generate the MAC-CE using a fixed format that can support the group-specific BFR information, cell BFR information, or both the group-specific BFR information and the cell BFR information.

In some aspects, when the UE triggers a group-specific BFR and a cell BFR at block 704, the UE may generate the BFR MAC-CE by generating a joint BFR MAC-CE that includes the group-specific BFR information and cell BFR information. In some aspects, the UE may transmit the joint BFR MAC-CE. In some aspects, the UE may generate the joint BFR MAC-CE using a format that includes BFR information for a plurality of cells, each cell of the plurality of cells being configured for at least one of group-specific BFR or cell BFR.

In some aspects, the BFR MAC-CE includes a MAC subheader, component carrier (CC) indices indicating CCs with failed beams, identification of one or more failed beams corresponding to the CC indices, identification of the one or more replacement beams, and presence flags indicating absence of the failed beam or presence of the one or more replacement beams. In some aspects, the BFR MAC-CE includes a first block with component carrier (CC) indices as rows of CC fields and a second block with rows of RS fields that include the presence flag and corresponding beam reference signal (RS) of the failed beam or of one of the one or more replacement beams, wherein rows of RS fields are arranged sequentially in order based on indication in the rows of CC fields. In some aspects, the CC fields include multiple bits indicating failure in individual beam groups of each CC. In some aspects, each of the CC fields is a single bit.

In some aspects, the UE may generate the BFR MAC-CE in a full format (e.g., as shown in FIG. 6A) or in a truncated format (as shown in FIG. 6B) depending on a UL grant size as discussed above. In some aspects, the UE may generate the BFR MAC-CE by generating a truncated group-specific BFR MAC-CE and a truncated group-specific BFR MAC-CE.

In some aspects, the BFR MAC-CE includes cell BFR information, which may include an indication of a cell failure, an indication of failed beams of the one or more replacement beam candidates in the cell, and an identification of one or more replacement beams. In some aspects, the cell BFR information is arranged in a first block (e.g., the block 602) of cell fields that indicate which cells have failed and a second block (e.g., the block 604) with failed beam identification and replacement beam identification. In some aspects, the cell BFR information further includes a presence field indication for each failed beam identification and each replacement beam identification.

In some aspects, the UE determines a resource used for transmitting the BFR MAC-CE. In some aspects, the UE may determine which transmission resource is used on which a BFR MAC-CE as discussed above can be transmitted, the BFR MAC-CE is a beam specific BFR MAC-CE or a joint BFR MAC-CE. In some example, the BFR MAC-CE can be sent according to a known accommodable UL scheduling grant. In some examples, the MAC-CE can be sent in RACH transmission process. In some embodiments, the BFR MAC-CE can be sent by first requesting a PUCCH resource that will accommodate the TRP specific MAC-CE with a SR.

At block 708, the UE transmits the BFR MAC-CE that includes the BFR information associated with the beam group using a transmission resource.

In some aspects, the UE may determine the transmission resource by identifying an existing uplink (UL) scheduling grant, and the transmission of the BFR MAC-CE at block 708 may include at least one of transmitting the BFR MAC-CE with UL resources identified in the UL grant if there are sufficient UL resources in the UL grant to transmit the BFR MAC-CE, transmitting a truncated BFR MAC-CE if there are insufficient resources for the BFR MAC-CE and sufficient resources for the truncated BFR MAC-CE, or transmitting a scheduling request (SR) for a new UL grant with sufficient resources to transmit the BFR MAC-CE.

In some aspects, if there are already sufficient resources granted in the UL grant, the UE may choose to transmit MAC CE with the resources provided for in the UL grant. If not, a RACH transmission may be used provided that the channels are available. A SR to receive an UL grant with transmission resources sufficient to transmit the MAC-CE may also be used. These options may be preset in order of preference in the UE, which may be configured with the order of preference.

In some aspects, an existing uplink (UL) scheduling grant may identify the transmission resource, and the transmission of the BFR MAC-CE may comprise one or more of the transmission of the BFR MAC-CE using the transmission resource if the transmission resource is sufficient for transmitting the BFR MAC-CE; the transmission of a truncated BFR MAC-CE using the transmission resource if the transmission resource is insufficient for transmitting the BFR MAC-CE but sufficient for transmitting the truncated BFR MAC-CE; or the transmission of a scheduling request (SR) for a new UL grant with a sufficient resource for transmitting the BFR MAC-CE.

In some aspects, the UE may further identify a BFR logical channel priority (LCP) to the BFR MAC-CE or the truncated BFR MAC-CE, and wherein the transmitting the BFR MAC-CE or the truncated BFR MAC-CE is based on the BFR LCP. In some aspects, the BFR LCP priority is lower than LCPs of cell radio network temporary identifier (C-RNTI) MAC-CE data or uplink common control channel (UL-CCCH) data, lower than or the same as LCPs of a configured grant confirmation MAC-CE, a BFR MAC-CE, or a multiple entry configured grant confirmation MAC-CE, higher than LCPs of a sidelink configured grant confirmation MAC-CE, and higher than LCPs of data from any logical channel except data from the UL-CCCH.

In some aspects, the transmitting the BFR MAC-CE at block 708 includes initiating a random access channel (RACH) procedure if a scheduling request (SR) is configured for BFR on a serving cell and PUCCH resources have not been configured for the UE.

In some aspects, the transmitting the BFR MAC-CE at block 708 includes initiating a random access channel (RACH) procedure if a scheduling request (SR) is not configured for BFR on a serving cell, and, in some instances, no existing UL grant is available.

In some aspects, the transmitting the BFR MAC-CE at block 708 includes initiating a random access channel (RACH) procedure if beam failure detected for all beam groups, TRPs, or configured BFD-RS sets on a primary cell.

In some aspects, the transmitting the BFR MAC-CE at block 708 includes transmitting the BFR MAC-CE as part of a RACH procedure. In some aspects, the RACH procedure can be a contention free RACH (CFRA) process, when the scrambling sequence and resources for the CFRA process is configured for the UE. In some aspects, the RACH procedure can be contention based RACH (CBRA) process, when no resources have been configured for the UE.

In some aspects, the UE may down-select the procedure and resource from multiple candidates to send the BFR request based on a predefined rule. For instance, the UE may first transmit BFR MAC-CE in PUSCH, if the existing UL grant is available; otherwise, UE may transmit BFR request in PUCCH-SR, if the PUCCH-SR resource is configured for the UE; otherwise, UE may transmit BFR request in a CFRA process, if the CFRA resource is configured; otherwise, UE may transmit BFR request in a CBRA process. In some aspects, the rule for down selection may be scenario dependent. For instance, in a scenario when beam failure is detected for all beam groups, or for a specific beam group, the UE may skip using existing UL grant to transmit BFR MAC-CE or transmitting PUCCH-SR as BFR request, and instead transmit the BFR request in a RACH procedure.

In some aspects, the UE may further cancel the triggering of the BFR (e.g., cancel all triggered BFRs) when a MAC Protocol Data Unit (PDU) is transmitted that includes the BFR MAC-CE.

In some aspects, the UE may further stop the RACH procedure when a MAC Protocol Data Unit (PDU) including the BFR MAC-CE is transmitted using an UL grant other than an UL grant provided by the RACH procedure. In some aspects, the UE may further stop the RACH procedure when a serving cell associated with the BFR MAC-CE is deactivated. In some aspects, the RACH procedure may be a two-step RACH procedure and the BFR MAC-CE is transmitted by the UE in a first message (e.g., first message of the two-step RACH procedure). In some aspects, the RACH procedure may be a four-step RACH procedure and the BFR MAC-CE is transmitted by the UE in a third message (e.g., third message of the four-step RACH procedure).

In some aspects, the UE may further transmit, based on the detecting the beam failure at block 702, a scheduling request (SR) with a SR ID on a PUCCH resource associated with a PUCCH resource ID and may receive an uplink (UL) scheduling grant. As part of transmitting the BFR MAC-CE at block 708, the UE may transmit the BFR MAC-CE according to the UL scheduling grant. In some aspects, the SR ID and the PUCCH resource ID are the same for each beam group of a serving cell. In some instances, the PUCCH resource ID is associated with at least one of a single fixed beam, a single beam dependent on the beam failure, or multiple beams corresponding to different repetitions of content. In some aspects, the SR ID is the same for each beam group of a serving cell and associated with a set of PUCCH Resource IDs. In some aspects, the UE may further identify, based on the detecting the beam failure of the at least one beam group at block 702, the PUCCH resource associated with the PUCCH resource ID from the set of PUCCH Resource IDs. In some aspects, the triggering the BFR at block 704 may include triggering at least one of a beam group BFR or a cell BFR, and the SR ID may be the same for each of the beam group BFR and the cell BFR.

Figure 8:
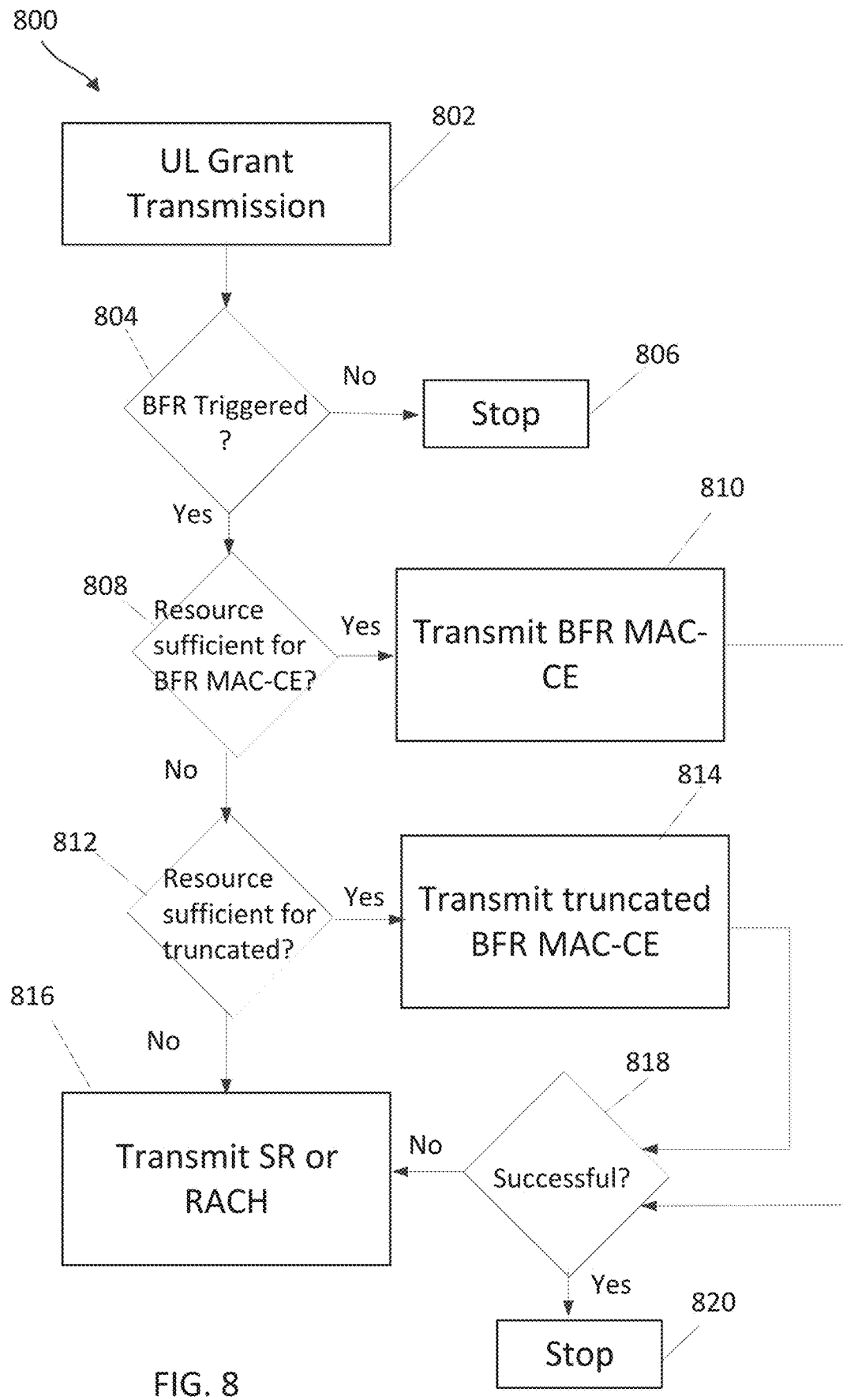
FIG. 8 is a flow diagram of a BFR MAC-CE transmission method that utilizes an uplink grant according to some aspects of the present disclosure.

FIG. 8 is a flow diagram of a BFR MAC-CE transmission method 800 that utilizes an UL grant according to some aspects of the present disclosure. Aspects of the method 800 can be executed by a UE, such as the such as UE 115, 205, 310, 344, 372, 400 discussed above in FIGS. 1, 2A, 3A, 3B, 3C, and 4. A UE may comprise a processor, processing circuit, and/or any other suitable component or means for performing the steps. For example, a UE 400 may utilize one or more components, such as the processor 402, the memory 404, the communication module 408, the BFD/BFR module 409, the transceiver 410, the modem 412, and the one or more antennas 416, to execute the steps of method 800. In some aspects, the method 800 may employ mechanisms discussed above with respect to FIGS. 1-6. As illustrated, the method 800 includes a number of enumerated steps, but aspects of the method 800 may include additional steps before, after, and in between the enumerated steps. In some aspects, one or more of the enumerated steps may be omitted or performed in a different order.

In some aspects, the UE may implement the method 800 as part of determining the resource for transmitting the BFR MAC-CE.

At block 802, resources for a UL grant transmission for a TRP specific BFR MAC-CE through resources identified in a known accommodable UL grant is started. At block 804, the UE MAC layer determines that at least one TRP specific BFR has been triggered as discussed above and has not been cancelled. If either of these conditions are not true, then method 800 proceeds to block 806 to stop the process. Otherwise, method 800 proceeds to block 808.

At block 808, the process determines whether the UL-SCH resources in the grant are available for a new transmission and if the UL-SCH resources identified in the known UL grant can accommodate the BFR MAC-CE (with its subheader). If so, the method 800 proceeds to block 810 where a multiplexing and assembly process to generate a MAC-CE that includes BFR MAC-CE is performed. The multiplexing and assembly process may a logic channel prioritization (LCP) procedure, as is discussed further below, which may prevent inclusion of the BFR MAC-CE in the MAC-CE. If the BFR MAC-CE is included, the MAC-CE with the BFR MAC-CE is then transmitted according to the UL grant in block 810 and the method 800 proceeds to block 818.

However, in block 808, if sufficient resources are not available, then method 800 proceeds to block 812. In block 812, method 800 determines whether the UL-SCH resources are sufficient to accommodate the truncated BFR MAC CE, for example that illustrated in FIG. 6B, plus its subheader. If those resources are sufficient, then method 800 proceeds to block 814 where a multiplexing and assembly procedure is performed to generate a MAC-CE that includes the truncated BFR MAC-CE. As discussed above, the multiplexing and assembly processes may include a LCP procedure that may prevent inclusion of the truncated BFR MAC-CE into the MAC-CE. If the truncated BFR MAC-CE is included in the MAC-CE, the BFR MAC-CE is transmitted according to the UL grant in block 814 and block 800 proceeds to block 818.

However, if it is determined in block 812 that the appropriate resources are not available, then method 800 triggers an SR transmission to receive UL grants for each BFR that has been triggered and not canceled in block 816. Additionally, in block 816, if the SR transmission cannot be made, then a RACH transmission process may be initiated.

A logical channel priority (LCP) refers to a priority for inclusion that is assigned to the BFR MAC-CE. The LCP is typically assigned in a DCI from the base station. The LCP indicates priority of inclusion in comparison with other types of MAC-CE, data from UL-CCCH (common control channel), and data from any logical channel. For a candidate UL grant, the order for the BFR MAC-CE in comparison with other MAC-CE data to be considered for multiplexing into this UL grant at blocks 810 and 814 is determined by its configured LCP. As a particular example, the LCP of a BFR MAC-CE can be lower than C-RNTI MAC-CE or data from UL-CCCH; can be lower than or the same as a Configured Grant Confirmation MAC-CE, another BFR MAC CE, or a Multiple Entry Configured Grant Confirmation MAC-CE; can be higher than a Sidelink Configured Grant Confirmation MAC-CE; and can be Higher than data from any Logical Channel, except data from UL-CCCH. Prioritization in the multiplexing and assembly process among MAC-CEs with the same priority is up to specific implementation of the UE executing method 800. Consequently, with this example, a BFR MAC-CE will be multiplexed in a MAC-CE before a Sidelink Configured Grant Confirmation MAC-CE but after a C-RNTI MAC-CE and the available resources may be used before the BFR MAC-CE can be included in the MAC-CE.

As also discussed above, BFRs can be canceled when a MAC PDU (Protocol Data Unit) that includes the BFR MAC-CE or truncated BFR MAC-CE. Consequently, all BFRs triggered prior to the MAC PDU assembly for BFR for a service cell can be cancelled when a MAC PDU is transmitted and this PDU includes the BFR MAC CE or truncated BFR MAC CE that contains BFR info of that failed beam in that cell. In some cases, only messages regarding the same beam group are canceled.

As discussed above, in block 816 of method 800 transmission of an SR may be discontinued and a RACH transmission initiated if configuration of the SR transmission is not appropriate. In one example, if the SR is configured for BFR for a service cell but the SR transmission for the BFR has been triggered without valid PUCCH resources configured, then a RACH transmission will be initiated instead to transmit the BFR MAC-CE in block 816. In some cases, the RACH transmission may be initiated on the SpCell coupled with the UE. In a second example, if the SR is not configured for BFR, then a RACH transmission is initiated to send the BFR MAC-CE.

Figure 9:
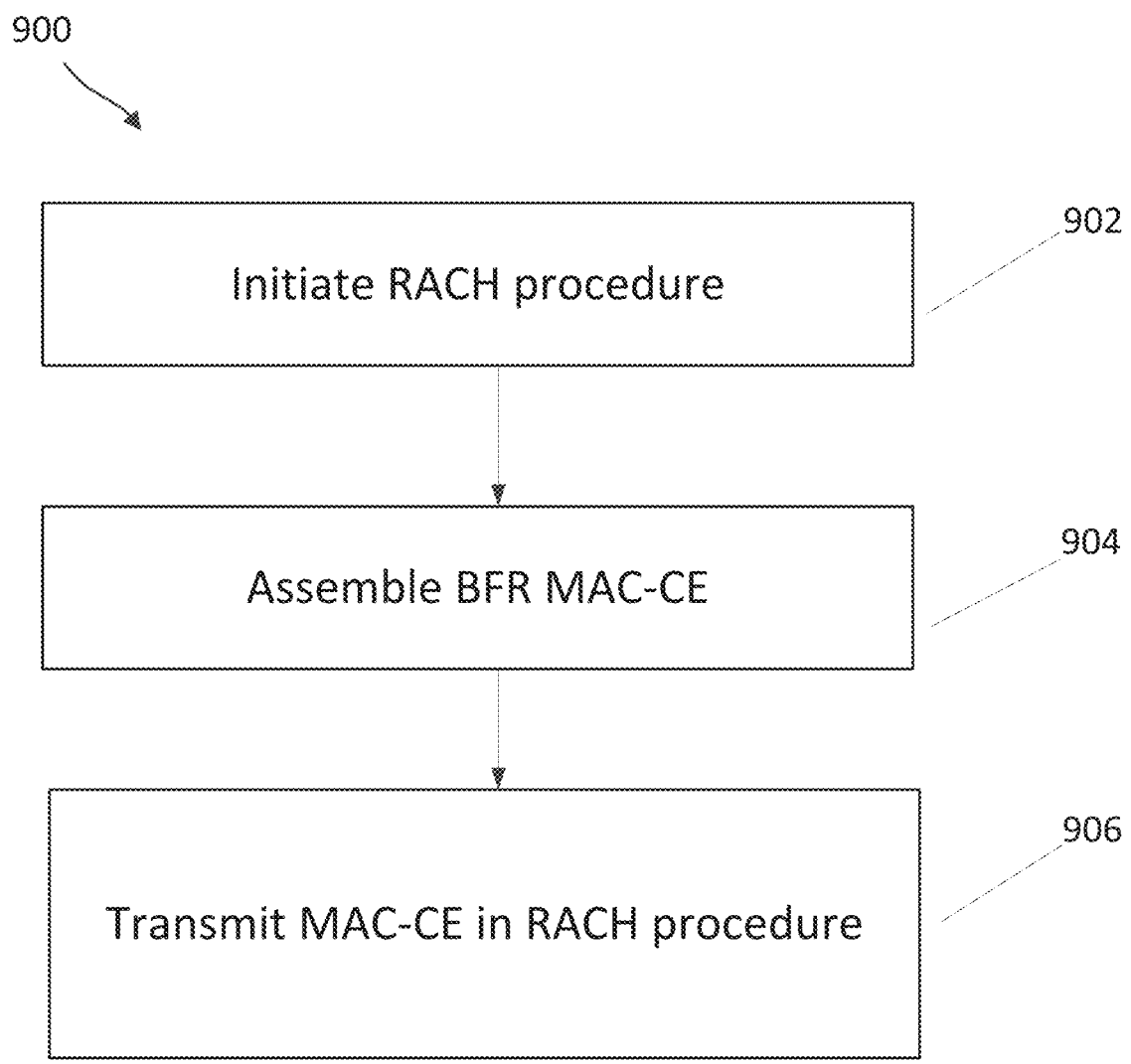
FIG. 9 is a flow diagram of a BFR MAC-CE transmission method that utilizes a random access channel (RACH) procedure according to some aspects of the present disclosure.

FIG. 9 is a flow diagram of a BFR MAC-CE transmission method 900 that utilizes a RACH procedure according to some aspects of the present disclosure. Aspects of the method 900 can be executed by a UE, such as the such as UE 115, 205, 310, 344, 372, 400 discussed above in FIGS. 1, 2A, 3A, 3B, 3C, and 4. A UE may comprise a processor, processing circuit, and/or any other suitable component or means for performing the steps. For example, a UE 400 may utilize one or more components, such as the processor 402, the memory 404, the communication module 408, the BFD/BFR module 409, the transceiver 410, the modem 412, and the one or more antennas 416, to execute the steps of method 900. In some aspects, the method 900 may employ mechanisms discussed above with respect to FIGS. 1-6. As illustrated, the method 900 includes a number of enumerated steps, but aspects of the method 900 may include additional steps before, after, and in between the enumerated steps. In some aspects, one or more of the enumerated steps may be omitted or performed in a different order.

In some aspects, the UE may implement the method 900 to determine one or more replacement candidate beams from a beam group (e.g., of block 702). In some instances, the UE may implement the method 900 as part of block 816 of FIG. 8. As illustrated in FIG. 9, once the RACH process is initiated in at block 902, a BFR MAC-CE is assembled at block 904 for transmission at block in step 906. At block 906, the RACH transmission is performed. RACH transmission can be a two-step or a four-step process over a beam in a beam group of the service cell. In a four-step process, the UE transmits a Random Access Request with a MSG1. A Random Access Response with MSG2 that includes an UL scheduling grant is then received. The UE then transmits in a UL scheduled transmission a MSG 3 that includes the BFR MAC-CE. Finally, a contention resolution message (MSG4) is received by the UE confirming the transmission. In a two-step RACH transmission process the UE provides a Random Access Request and preconfigured preamble and the BFR MAC-CE with MSG1. The UE then receives a MSG2 with a Random Access Response. Consequently, the BFR MAC-CE can be transmitted on MSG1 of a 2-step RACH transmission or MSG3 of a four-step RACH transmission.

The ongoing RACH method 900 as illustrated in FIG. 9 can be stopped when certain conditions are found. A first condition that can stop the RACH method 900 is when the MAC PDU is transmitted using a UL grant other than a UL grant provided by a Random Access Response (e.g. in MSG2 of 4-step RACH) or a UL grant determined for the transmission of the MSG1 payload (e.g. in MSG1 in 2-step RACH) and this PDU contains a BFR MAC-CE or truncated BFR MAC-CE that includes BFR info of the same service cell as the current BFR MAC-CE. A second condition that can stop the RACH procedure is deactivation of service cell or cells requiring the specific BFR.

Figure 10:
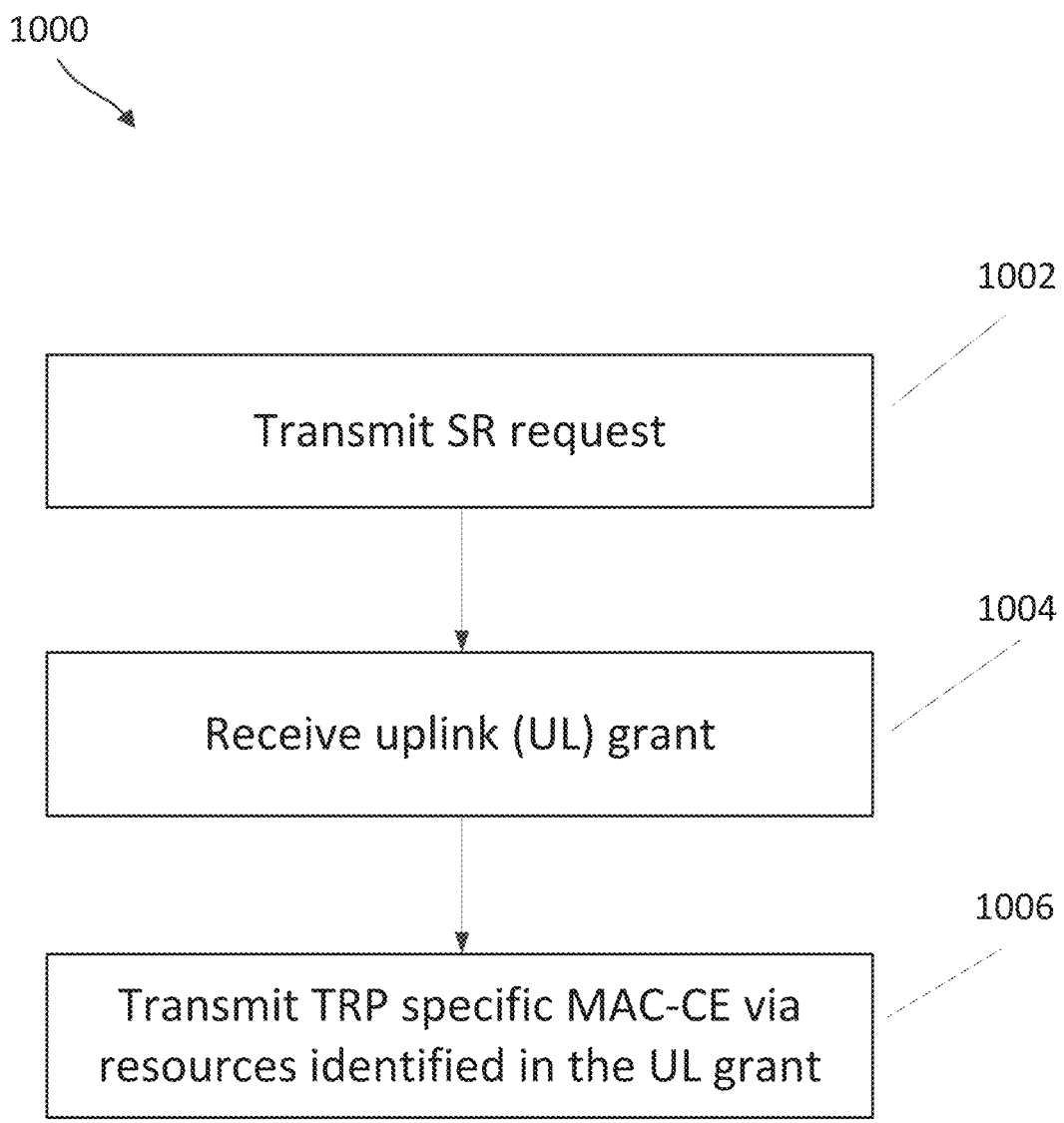
FIG. 10 is a flow diagram of a scheduling request method for transmission of the BFR MAC-CE according to some aspects of the present disclosure.

FIG. 10 is a flow diagram of a scheduling request method 1000 for transmission of the BFR MAC-CE according to some aspects of the present disclosure. Aspects of the method 1000 can be executed by a UE, such as the such as UE 115, 205, 310, 344, 372, 400 discussed above in FIGS. 1, 2A, 3A, 3B, 3C, and 4. A UE may comprise a processor, processing circuit, and/or any other suitable component or means for performing the steps. For example, a UE 400 may utilize one or more components, such as the processor 402, the memory 404, the communication module 408, the BFD/BFR module 409, the transceiver 410, the modem 412, and the one or more antennas 416, to execute the steps of method 1000. In some aspects, the method 1000 may employ mechanisms discussed above with respect to FIGS. 1-6. As illustrated, the method 1000 includes a number of enumerated steps, but aspects of the method 1000 may include additional steps before, after, and in between the enumerated steps. In some aspects, one or more of the enumerated steps may be omitted or performed in a different order.

In some aspects, the UE may implement the method 1000 as part of the block 710 of method 700 or if block 816 is reached in method 800 and succeeds in triggering the SR transmission process. As indicated in FIG. 10, method 1000 starts at block 1002 with transmission of an SR request. At block 1004, a UL grant can be received and at block 1006 the BFR MAC-CE can be transmitted via resources identified in the resulting UL grant. In general, the SR transmission is performed by sending an SR ID (schedulingRequestid) on a PUCCH resource identified by a PUCCH Resource ID (PUCCH-ResourceId), both of which may be configured on the UE for this purpose.

In one option of block 1002, the SR transmission is triggered with a SR ID and PUCCH Resource ID that is specific to the beam group. Therefore, the UE PHY layer transmits the SR according to the PUCCH Resource ID with an UL beam indicated for that PUCCH resource (e.g., an UL beam reachable to the another working beam group). Different SR IDs may have the same or different PUCCH Resource IDs. In some embodiments, each SR ID can be explicitly associated with a beam group ID. In a first option, the SR ID for the BFR on a failed TRP ID of X can be configured in an information element (IE) of a MAC Cell Group Configuration (MAC-CellGroupConfig) (e.g., the MAC Cell Group Configuration can include parameters (schedulingRequest ID-BFR-TRP-X, Scheduling Request ID). In a second option, a new parameter of beam group ID can be introduced to the scheduling request configuration (SchedulingRequestConfig). In that case, the IE of the scheduling request configuration may have the following RRC parameters: BeamGroupID, schedulingRequestID, sr-ProhibitTimer, sr-TransMax, and SR Counter.

In another option, at block 1002 the SR is transmitted with a single set of (SR ID, PUCCH Resource ID). Regardless of the failed beam group ID, the UE MAC triggers the same SR with corresponding SR ID and UE PHY layer transmits the SR on the corresponding PUCCH resource identified by the corresponding PUCCH Resource ID. A single SR ID can be configured for the general purpose of BFR MAC-CE transmission, regardless of which beam group in which service cell triggers the BFR. For example, the RS ID for the purpose of transmission of a BFR MAC-CE can be specified in the IE of the MAC Cell Group Configuration (MAC-CellGroupConfig) with parameters (schedulingRequestID-BFR-BeamGroup, SchedulingRequestID). The UL beam for the single PUCCH resource can be a single fixed beam, a single beam depending on the failed TRP ID (e.g. using a UL beam reachable to the working beam group 2 when beam group 1 fails), or multiple UL beams corresponding to different repetitions of the PUCCH content (e.g. to multiple beam groups where the multiple UL beams can be transmitted with SDM/FDM/TDM modulation formats.

In another option, at block 1002 the SR can be transmitted with a single SR ID that is mapped to multiple PUCCH Resource IDs. Consequently, if a BFR is triggered for one failed beam group, then regardless of the failed beam group ID, UE MAC layer triggers the same SR with the corresponding SR ID and transmits it on corresponding PUCCH resources associated with a set of PUCCH-Resource IDs. The signal SR ID can be configured as discussed above.

The multiple PUCCH Resource IDs mapped to the signal SR ID can be configured in the IE of the scheduling request resource configuration (SchedulingRequestResourceConfig), which may have the following RRC parameters: (SchedulingRequestResourceID, phy-PriorityIndex). Multiple pairs of (PUCCH-ResourceID, periodicityAndOffset) can also be included in the configuration. Each pair specifies one PUCCH resource that can indicate a UL beam reachable to a particular beam group. The multiple PUCCH resources can use FDM/SDM/or TDM if simultaneous multiple PUCCH transmission is not allowed.

In cases where a SR transmission is triggered with a single SR ID, the SR transmission can be triggered by either a beam group specific BFR, a cell BFR, or both. The SR transmission requests a UL grant for transmission of the joint BFR MAC-CE that includes both beam group specific BFR MAC-CE information and cell BFR MAC-CE information. In some embodiments, the single SR ID can reuse that for a cell BFR (e.g. schedulingRequestID-BFR-SCell-r16). If a BFR is triggered for one failed beam group or one failed cell for any serving cell configured with beam group specific BFR and/or cell BFR, then regardless of the failed beam group and/or cell IDs, the UE MAC layer triggers the same SR with corresponding SR ID and, hence, the UE PHY layer transmits the SR on the corresponding PUCCH Resource ID(s), as has been previously discussed above. Further, after receiving an UL grant, the UE transmits the joint BFR MAC-CE as discussed above.

Figure 11:
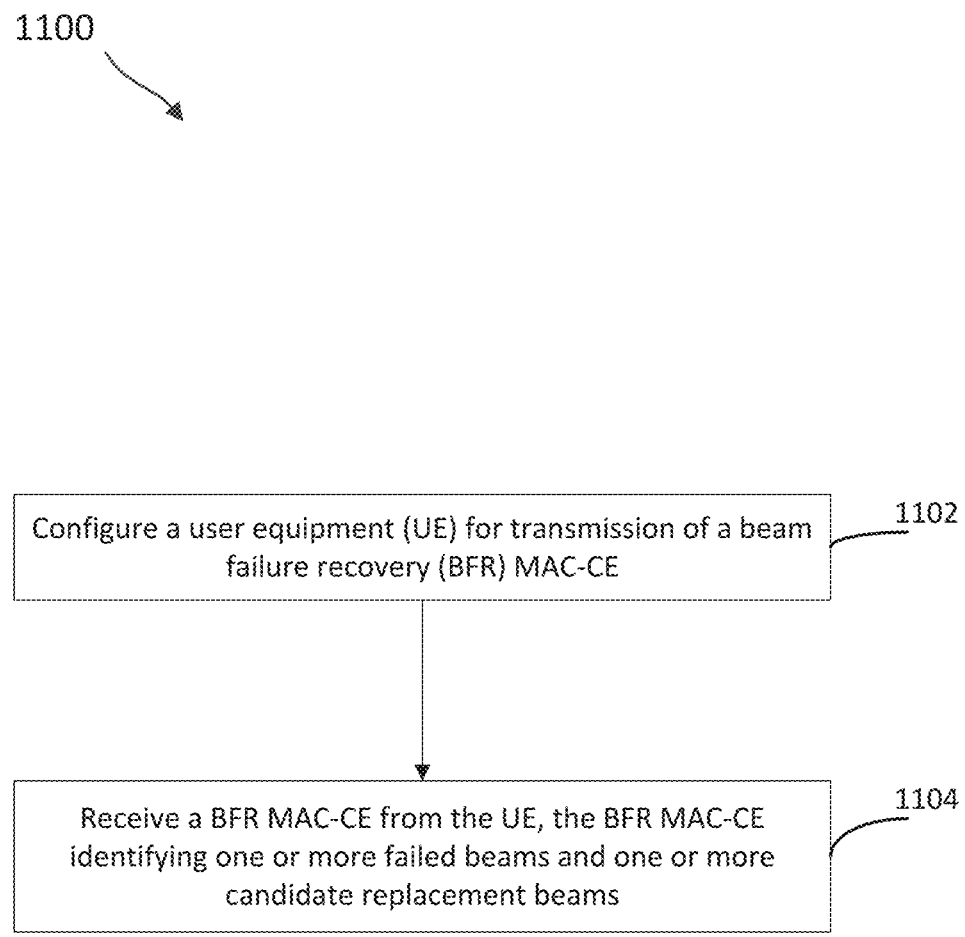
FIG. 11 is a flow diagram of a BFR method according to some aspects of the present disclosure.

FIG. 11 is a flow diagram of a BFR method 1100 according to some aspects of the present disclosure. Aspects of the method 1100 can be executed by a UE, such as the such as BS 105 discussed above in FIG. 1, Pcell/Scell 210, 305, 342, 346, 374, 376 as discussed above in FIGS. 2A, 3A, 3B, and 3C, and/or a TRP 215 as discussed above in FIG. 2A. ABS may comprise a processor, processing circuit, and/or any other suitable component or means for performing the steps. For example, a BS 500 may utilize one or more components, such as the processor 502, the memory 504, the communication module 508, the BFD/BFR module 509, the transceiver 510, the modem 512, and the one or more antennas 516, to execute the steps of method 1100. In some aspects, the method 1100 may employ mechanisms discussed above with respect to FIGS. 1-6. As illustrated, the method 1100 includes a number of enumerated steps, but aspects of the method 1100 may include additional steps before, after, and in between the enumerated steps. In some aspects, one or more of the enumerated steps may be omitted or performed in a different order. As illustrated, at block 1102 the BS configures a user equipment (UE) for transmission of a beam failure recovery (BFR) MAC-CE, for example, as discussed above. For instance, the BS can transmit configuration information to the UE in one or more DCI transmission to the UE. For example, at block 1102, the BS can configure the logical channel priorities (LCP) for inclusion of the BFR MAC CE into a MAC CE. In some aspects, the LCP is set to be lower than or the same as LCPs of a configured grant confirmation MAC-CE, a BFR MAC-CE, or a multiple entry configured grant confirmation MAC-CE, lower than or the same as LCPs of a configured grant confirmation MAC-CE, a BFR MAC-CE, or a multiple entry configured grant confirmation MAC-CE, higher than LCPs of a sidelink configured grant confirmation MAC-CE, and higher than LCPs of data from any logical channel except data from the UL-CCCH.

In some aspects, as part of configuring the UE, the BS may configure SR IDs and corresponding PUCCH resource IDs for the UE transmission of the SR request, and other parameters associated with operation of the UE. In some aspects, as part of configuring the UE, the BS may the SR ID and the PUCCH resource ID includes configuring the SR ID and the PUCCH resource ID to be the same for each beam of a service cell. In some aspects, as part of configuring the UE, the BS may configure the SR ID and the PUCCH resource ID includes configuring the SR ID and PUCCH resource ID to be associated with at least one of a single fixed beam, a single beam dependent on the beam failure, or multiple beams corresponding to different repetitions of content. In some aspects, as part of configuring the UE, the BS may configure the SRID and the PUCCH resource ID including configuring the SR ID to be the same for each beam group of a serving cell and associated with a set of PUCCH resource IDs.

At block 1104, the BS receives the BFR MAC-CE from the UE, for example, through any of the above transmission processes and contains information as discussed above. In some examples, the receipt of the BFR MAC-CE includes providing a UL scheduling grant in response to a scheduling request. In some aspects, the configuration at block 1102 include a scheduling request (SR) ID and PUCCH resource ID for the UE transmission of a SR request, the BS may respond to a SR request with an uplink (UL) scheduling grant and receive the BFR MAC-CE in accordance with the UL scheduling grant. In some instances, the BFR MAC-CE may include or identify one or more failed beams and one or more candidate replacement beams. That is, the BS may identify, from the BFR MAC-CE, one or more failed beams and one or more candidate replacement beams.

Recitation of Various Aspects of the Present Disclosure

Aspect 1: A method of wireless communication performed by a user equipment (UE), the method comprising: detecting a beam failure of at least one beam of a beam group; triggering a beam failure recovery (BFR) in response to the detection of the beam failure of the at least one beam of the beam group; generating a BFR medium access control-control element (MAC-CE) that includes BFR information associated with the beam group; and transmitting the BFR MAC-CE that includes the BFR information associated with the beam group using a transmission resource.

Aspect 2: The method of aspect 1, wherein the BFR information includes group-specific BFR information and cell BFR information, the generating the BFR MAC-CE comprising: generating the BFR MAC-CE using a flexible format that can support the group-specific BFR information or the cell BFR information, and setting a value of an indicator in the BFR MAC-CE to indicate whether the BFR MAC-CE includes the group-specific BFR information or the cell BFR information.

Aspect 3: The method of aspect 2, wherein: the group-specific BFR information includes a transmission-reception point (TRP) identifier, a first cell identifier, and at least one first replacement beam candidate; and the cell BFR information includes a second cell identifier and at least one second replacement beam candidate.

Aspect 4: The method of aspect 1, wherein the BFR information includes group-specific BFR information and cell BFR information, the generating the BFR MAC-CE comprising: generating the BFR MAC-CE using a fixed format that can support the group-specific BFR information, the cell BFR information, or both the group-specific BFR information and the cell BFR information.

Aspect 5: The method of aspect 4, wherein: the triggering the BFR includes triggering a group-specific BFR and triggering a cell BFR, the generating the BFR MAC-CE includes generating a joint BFR MAC-CE that includes the group-specific BFR information and the cell BFR information, and the transmitting the BFR MAC-CE includes transmitting the joint BFR MAC-CE.

Aspect 6: The method of aspect 5, wherein the generating the joint BFR MAC-CE comprises: generating the joint BFR MAC-CE using a format that includes the BFR information for a plurality of cells, each cell of the plurality of cells being configured for at least one of the group-specific BFR or the cell BFR.

Aspect 7: The method of any of aspects 1-6, wherein the BFR MAC-CE includes a MAC subheader, component carrier (CC) indices indicating CCs with one or more failed beams, identification of the one or more failed beams corresponding to the CC indices, identification of one or more replacement beams, and a presence flag indicating absence of the one or more failed beams or presence of the one or more replacement beams.

Aspect 8: The method of aspect 7, wherein the BFR MAC-CE includes a first block with the component carrier (CC) indices as rows of CC fields and a second block with rows of reference signal (RS) fields that include the presence flag and corresponding beam RS of the failed one or more beams or of one of the one or more replacement beams, wherein the rows of RS fields are arranged sequentially in order based on indication in the rows of CC fields.

Aspect 9: The method of aspect 8, wherein the CC fields include multiple bits indicating failure in individual beam groups of each CC.

Aspect 10: The method of aspect 8, wherein each of the CC fields is a single bit.

Aspect 11: The method of any of aspects 1-10, wherein: the generating the BFR MAC-CE includes generating a truncated group-specific BFR MAC-CE; and the transmitting the BFR MAC-CE includes transmitting the truncated group-specific BFR MAC-CE.

Aspect 12: The method of any of aspects 1-11, wherein the BFR MAC-CE includes cell BFR information, the cell BFR information including an indication of a cell failure, a failed beam identification of a failed beam of one or more replacement beam candidates in the cell, and a replacement beam identification of one or more replacement beams.

Aspect 13: The method of aspect 12, wherein the cell BFR information is arranged in a first block of cell fields that indicate which cells have failed and a second block with the failed beam identification and the replacement beam identification.

Aspect 14: The method of aspect 12, wherein the cell BFR information further includes a presence field indication for the failed beam identification and the replacement beam identification.

Aspect 15: The method of any of aspects 1-14, further comprising: cancelling the triggering the BFR when a MAC Protocol Data Unit (PDU) is transmitted that includes the BFR MAC-CE.

Aspect 16: The method of any of aspects 1-15, wherein an existing uplink (UL) scheduling grant identifies the transmission resource, the transmitting the BFR MAC-CE comprising at least one of: transmitting the BFR MAC-CE using the transmission resource if the transmission resource is sufficient for transmitting the BFR MAC-CE; transmitting a truncated BFR MAC-CE using the transmission resource if the transmission resource is insufficient for transmitting the BFR MAC-CE but sufficient for transmitting the truncated BFR MAC-CE; or transmitting a scheduling request (SR) for a new UL grant with a sufficient resource for transmitting the BFR MAC-CE.

Aspect 17: The method of aspect 16, wherein the transmitting the BFR MAC-CE or the truncated BFR MAC-CE is based on a BFR logical channel priority (LCP) of the BFR MAC-CE or the truncated BFR MAC-CE.

Aspect 18: The method of aspect 17, wherein the BFR LCP priority is: lower than LCPs of cell radio network temporary identifier (C-RNTI) MAC-CE data or uplink common control channel (UL-CCCH) data; lower than or same as LCPs of a configured grant confirmation MAC-CE, a BFR MAC-CE, or a multiple entry configured grant confirmation MAC-CE; higher than LCPs of a sidelink configured grant confirmation MAC-CE; and higher than LCPs of data from any logical channel except data from the UL-CCCH.

Aspect 19: The method of any of aspects 1-18, wherein the transmitting the BFR MAC-CE includes initiating a random access channel (RACH) procedure if a SR is configured for the BFR on a serving cell and PUCCH resources have not been configured for the UE.

Aspect 20: The method of any of aspects 1-19, wherein the transmitting the BFR MAC-CE includes initiating a RACH procedure if a SR is not configured for the BFR on a serving cell.

Aspect 21: The method of any of aspects 1-20, wherein the transmitting the BFR MAC-CE comprises: transmitting the BFR MAC-CE as part of a RACH procedure.

Aspect 22: The method of aspect 21, further comprising at least one of: stopping the RACH procedure when a MAC protocol data unit (PDU) including the BFR MAC-CE is transmitted using an UL grant other than an UL grant provided by the RACH procedure; and stopping the RACH procedure when a serving cell associated with the BFR MAC-CE is deactivated.

Aspect 23: The method of aspect 21 or 22, wherein the RACH procedure is a two-step RACH procedure and the BFR MAC-CE is transmitted by the UE in a first message of the two-step RACH procedure.

Aspect 24: The method of any of aspects 21-23, wherein the RACH procedure is a four-step RACH procedure and the BFR MAC-CE is transmitted by the UE in a third message of the four-step RACH procedure.

Aspect 25: The method of any of aspects 1-24, further comprising: transmitting, based on the detecting the beam failure, a SR with a SR ID on a PUCCH resource associated with a PUCCH resource ID; and receiving an UL scheduling grant, wherein: the transmitting the BFR MAC-CE comprises transmitting the BFR MAC-CE according to the UL scheduling grant.

Aspect 26: The method of aspect 25, wherein the SR ID and the PUCCH resource ID are same for each beam group of a serving cell.

Aspect 27: The method of aspect 26, wherein the PUCCH resource ID is associated with at least one of a single fixed beam, a single beam dependent on the beam failure, or multiple beams corresponding to different repetitions of content.

Aspect 28: The method of any of aspects 25-27, wherein the SR ID is same for each beam group of a serving cell and associated with a set of PUCCH resource IDs including the PUCCH resource ID.

Aspect 29: The method of aspect 28, further comprising: identifying, based on the detecting the beam failure of the at least one beam group, the PUCCH resource associated with the PUCCH resource ID from the set of PUCCH resource IDs.

Aspect 30: The method of any of aspects 25-29, wherein: the triggering the BFR includes triggering at least one of a beam group BFR or a cell BFR; and the SR ID is same for each of the beam group BFR and the cell BFR.

Aspect 31: A user equipment (UE), comprising: a memory; a processor coupled to the memory; and a transceiver coupled to the processor, the UE configured to perform the methods of aspects 1-30.

Aspect 32: A user equipment (UE) comprising means for performing the methods of aspects 1-30.

Aspect 33: A non-transitory computer-readable medium (CRM) having program code recorded thereon, the program code comprising code for causing a user equipment (UE) to perform the methods of aspects 1-30.

Aspect 34: A method of wireless communication performed by a base station (BS), the method comprising: configuring a user equipment (UE) for transmission of a beam failure recovery (BFR) MAC-CE; and receiving the BFR MAC-CE from the UE, the BFR MAC-CE identifying one or more failed beams and one or more candidate replacement beams.

Aspect 35: The method of aspect 34, wherein configuring the UE includes configuring logical channel priorities (LCP) for inclusion of the BFR MAC CE into a MAC CE.

Aspect 36: The method of aspect 35, wherein the LCP is set to be: lower than or same as LCPs of a configured grant confirmation MAC-CE, a BFR MAC-CE, or a multiple entry configured grant confirmation MAC-CE; lower than or same as LCPs of a configured grant confirmation MAC-CE, a BFR MAC-CE, or a multiple entry configured grant confirmation MAC-CE; higher than LCPs of a sidelink configured grant confirmation MAC-CE; and higher than LCPs of data from any logical channel except data from the UL-CCCH.

Aspect 37: The method of aspect 35 or 36, wherein: the configuring the UE includes configuring a scheduling request (SR) ID and a PUCCH resource ID for transmission of a SR request from the UE to the base station, and the receiving the BFR MAC-CE includes: responding to the SR request with an uplink (UL) scheduling grant; and receiving the BFR MAC-CE in accordance with the UL scheduling grant.

Aspect 38: The method of aspect 37, wherein the configuring the SR ID and the PUCCH resource ID includes configuring the SR ID and the PUCCH resource ID to be same for each beam of a service cell.

Aspect 39: The method of aspect 37 or 38, wherein the configuring the SR ID and the PUCCH resource ID includes configuring the SR ID and PUCCH resource ID to be associated with at least one of a single fixed beam, a single beam dependent on the beam failure, or multiple beams corresponding to different repetitions of content.

Aspect 40: The method of any of aspects 37-39, wherein the configuring the SR ID and the PUCCH resource ID includes configuring the SR ID to be same for each beam group of a serving cell and associated with a set of PUCCH resource IDs including the PUCCH resource ID.

Aspect 41: A base station (BS), comprising: a memory; a processor coupled to the memory; and a transceiver coupled to the processor, the BS configured to perform the methods of aspects 34-40.

Aspect 42: A base station (BS) comprising means for performing the methods of aspects 34-40.

Aspect 43: A non-transitory computer-readable medium (CRM) having program code recorded thereon, the program code comprising code for causing a base station (BS) to perform the methods of aspects 1-30.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   detecting a beam failure of at least one beam of a beam group;
   triggering a beam failure recovery (BFR) in response to the detection of the beam failure of the at least one beam of the beam group;
   generating a BFR medium access control-control element (MAC-CE) that includes BFR information associated with the beam group, wherein the BFR MAC-CE includes a MAC subheader, component carrier (CC) indices indicating CCs with one or more failed beams, identification of the one or more failed beams corresponding to the CC indices, identification of one or more replacement beams, and a presence flag indicating absence of the one or more failed beams or presence of the one or more replacement beams; and
   transmitting the BFR MAC-CE that includes the BFR information associated with the beam group using a transmission resource.

2. The method of claim 1, wherein the BFR information includes group-specific BFR information and cell BFR information, the generating the BFR MAC-CE comprising:
   generating the BFR MAC-CE using a flexible format that can support the group-specific BFR information or the cell BFR information, and
   setting a value of an indicator in the BFR MAC-CE to indicate whether the BFR MAC-CE includes the group-specific BFR information or the cell BFR information.

3. The method of claim 2, wherein:
   the group-specific BFR information includes a transmission-reception point (TRP) identifier, a first cell identifier, and at least one first replacement beam candidate; and
   the cell BFR information includes a second cell identifier and at least one second replacement beam candidate.

4. The method of claim 1, wherein the BFR information includes group-specific BFR information and cell BFR information, the generating the BFR MAC-CE comprising:
   generating the BFR MAC-CE using a fixed format that can support the group-specific BFR information, the cell BFR information, or both the group-specific BFR information and the cell BFR information.

5. The method of claim 4, wherein:
   the triggering the BFR includes triggering a group-specific BFR and triggering a cell BFR,
   the generating the BFR MAC-CE includes generating a joint BFR MAC-CE that includes the group-specific BFR information and the cell BFR information, and
   the transmitting the BFR MAC-CE includes transmitting the joint BFR MAC-CE.

6. The method of claim 5, wherein the generating the joint BFR MAC-CE comprises:
   generating the joint BFR MAC-CE using a format that includes the BFR information for a plurality of cells, each cell of the plurality of cells being configured for at least one of the group-specific BFR or the cell BFR.

7. The method of claim 1, wherein the BFR MAC-CE includes a first block with the component carrier (CC)

indices as rows of CC fields and a second block with rows of reference signal (RS) fields that include the presence flag and corresponding beam RS of the failed one or more beams or of one of the one or more replacement beams, wherein the rows of RS fields are arranged sequentially in order based on indication in the rows of CC fields.

8. The method of claim 7, wherein: the CC fields include multiple bits indicating failure in individual beam groups of each CC; or each of the CC fields is a single bit.

9. The method of claim 1, wherein:
the generating the BFR MAC-CE includes generating a truncated group-specific BFR MAC-CE; and
the transmitting the BFR MAC-CE includes transmitting the truncated group-specific BFR MAC-CE.

10. A method of wireless communication performed by a user equipment (UE), the method comprising:
detecting a beam failure of at least one beam of a beam group;
triggering a beam failure recovery (BFR) in response to the detection of the beam failure of the at least one beam of the beam group;
generating a BFR medium access control-control element (MAC-CE) that includes BFR information associated with the beam group, wherein the BFR MAC-CE includes cell BFR information, the cell BFR information including an indication of a cell failure, a failed beam identification of a failed beam of one or more replacement beam candidates in the cell, and a replacement beam identification of one or more replacement beams; and
transmitting the BFR MAC-CE that includes the BFR information associated with the beam group using a transmission resource.

11. The method of claim 10, wherein the cell BFR information is arranged in a first block of cell fields that indicate which cells have failed and a second block with the failed beam identification and the replacement beam identification.

12. The method of claim 10, wherein the cell BFR information further includes a presence field indication for the failed beam identification and the replacement beam identification.

13. The method of claim 10, further comprising:
cancelling the triggering the BFR when a MAC Protocol Data Unit (PDU) is transmitted that includes the BFR MAC-CE.

14. The method of claim 10, wherein an existing uplink (UL) scheduling grant identifies the transmission resource, wherein the transmission resource comprises a size, the transmitting the BFR MAC-CE comprising at least one of:
transmitting the BFR MAC-CE using the transmission resource if the size of the transmission resource can accommodate transmission of the BFR MAC-CE;
transmitting a truncated BFR MAC-CE using the transmission resource if the size of the transmission resource cannot accommodate transmission of the BFR MAC-CE but the size of the transmission resource can accommodate transmission of the truncated BFR MAC-CE; or
transmitting a scheduling request (SR) for a new UL grant with a sufficient resource for transmitting the BFR MAC-CE.

15. The method of claim 14, wherein the transmitting the BFR MAC-CE or the truncated BFR MAC-CE is based on a BFR logical channel priority (LCP) of the BFR MAC-CE or the truncated BFR MAC-CE.

16. The method of claim 15, wherein the BFR LCP priority is:
lower than LCPs of cell radio network temporary identifier (C-RNTI) MAC-CE data or uplink common control channel (UL-CCCH) data;
lower than or same as LCPs of a configured grant confirmation MAC-CE, a BFR MAC-CE, or a multiple entry configured grant confirmation MAC-CE;
higher than LCPs of a sidelink configured grant confirmation MAC-CE; and
higher than LCPs of data from any logical channel except data from the UL-CCCH.

17. The method of claim 10, wherein the transmitting the BFR MAC-CE includes initiating a random access channel (RACH) procedure if (i) a scheduling request (SR) is configured for the BFR on a serving cell and physical uplink control channel (PUCCH) resources have not been configured for the UE; or (ii) a SR is not configured for the BFR on a serving cell.

18. The method of claim 10, wherein the transmitting the BFR MAC-CE comprises:
transmitting the BFR MAC-CE as part of a random access channel (RACH) procedure.

19. The method of claim 18, further comprising at least one of:
stopping the RACH procedure when a MAC protocol data unit (PDU) including the BFR MAC-CE is transmitted using an uplink (UL) grant other than an UL grant provided by the RACH procedure; and
stopping the RACH procedure when a serving cell associated with the BFR MAC-CE is deactivated.

20. The method of claim 18, wherein:
the RACH procedure is a two-step RACH procedure and the BFR MAC-CE is transmitted by the UE in a first message of the two-step RACH procedure; or
the RACH procedure is a four-step RACH procedure and the BFR MAC-CE is transmitted by the UE in a third message of the four-step RACH procedure.

21. The method of claim 10, further comprising:
transmitting, based on the detecting the beam failure, a scheduling request (SR) with a SR ID on a physical uplink control channel (PUCCH) resource associated with a PUCCH resource ID; and
receiving an UL scheduling grant, wherein:
the transmitting the BFR MAC-CE comprises transmitting the BFR MAC-CE according to the UL scheduling grant.

22. The method of claim 21, wherein the SR ID and the PUCCH resource ID are same for each beam group of a serving cell.

23. The method of claim 22, wherein the PUCCH resource ID is associated with at least one of a single fixed beam, a single beam dependent on the beam failure, or multiple beams corresponding to different repetitions of content.

24. The method of claim 21, wherein the SR ID is same for each beam group of a serving cell and associated with a set of PUCCH resource IDs including the PUCCH resource ID.

25. The method of claim 24, further comprising:
identifying, based on the detecting the beam failure of the at least one beam group, the PUCCH resource associated with the PUCCH resource ID from the set of PUCCH resource IDs.

26. The method of claim 21, wherein:
the triggering the BFR includes triggering at least one of a beam group BFR or a cell BFR; and
the SR ID is same for each of the beam group BFR and the cell BFR.

27. A user equipment (UE), comprising:
a memory;
a processor coupled to the memory and configured to:
detect a beam failure of at least one beam of a beam group;
trigger a beam failure recovery (BFR) in response to the detection of the beam failure of the at least one beam of the beam group; and
generate a BFR medium access control-control element (MAC-CE) that includes BFR information associated with the beam group, wherein the BFR MAC-CE includes a MAC subheader, component carrier (CC) indices indicating CCs with one or more failed beams, identification of the one or more failed beams corresponding to the CC indices, identification of one or more replacement beams, and a presence flag indicating absence of the one or more failed beams or presence of the one or more replacement beams; and
a transceiver coupled to the processor and configured to:
transmit the BFR MAC-CE that includes the BFR information associated with the beam group using a transmission resource.

28. A user equipment (UE), comprising:
a memory;
a processor coupled to the memory and configured to:
detect a beam failure of at least one beam of a beam group;
trigger a beam failure recovery (BFR) in response to the detection of the beam failure of the at least one beam of the beam group; and
generate a BFR medium access control-control element (MAC-CE) that includes BFR information associated with the beam group, wherein the BFR MAC-CE includes cell BFR information, the cell BFR information including an indication of a cell failure, a failed beam identification of a failed beam of one or more replacement beam candidates in the cell, and a replacement beam identification of one or more replacement beams; and
a transceiver coupled to the processor and configured to:
transmit the BFR MAC-CE that includes the BFR information associated with the beam group using a transmission resource.

* * * * *